(12) United States Patent
Aoyagi et al.

(10) Patent No.: US 9,681,240 B2
(45) Date of Patent: Jun. 13, 2017

(54) SOUND QUALITY ADJUSTMENT APPARATUS OF APPROACHING VEHICLE AUDIBLE SYSTEM, APPROACHING VEHICLE AUDIBLE SYSTEM SIMULATOR, AND APPROACHING VEHICLE AUDIBLE SYSTEM

(71) Applicants: Takahisa Aoyagi, Tokyo (JP); Asako Omote, Tokyo (JP); Yoichi Kato, Tokyo (JP)

(72) Inventors: Takahisa Aoyagi, Tokyo (JP); Asako Omote, Tokyo (JP); Yoichi Kato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 140 days.

(21) Appl. No.: 14/418,523

(22) PCT Filed: Oct. 15, 2012

(86) PCT No.: PCT/JP2012/076626
§ 371 (c)(1),
(2) Date: Jan. 30, 2015

(87) PCT Pub. No.: WO2014/061084
PCT Pub. Date: Apr. 24, 2014

(65) Prior Publication Data
US 2015/0264500 A1 Sep. 17, 2015

(51) Int. Cl.
*H04R 29/00* (2006.01)
*G10K 15/00* (2006.01)
*B60Q 5/00* (2006.01)

(52) U.S. Cl.
CPC ............ *H04R 29/00* (2013.01); *G10K 15/00* (2013.01); *B60Q 5/008* (2013.01); *H04R 2499/13* (2013.01)

(58) Field of Classification Search
USPC ..... 381/26, 56, 57, 71.4, 86, 94.1, 302, 339, 381/365, 389
See application file for complete search history.

(56) References Cited

U.S. PATENT DOCUMENTS 5,635,903 A * 6/1997 Koike .................... A63H 17/34
340/384.1
2012/0130580 A1 5/2012 Omote et al.

FOREIGN PATENT DOCUMENTS

JP 2001-290489 A 10/2001
JP 2011-207390 A 10/2011
(Continued)

OTHER PUBLICATIONS

International Search Report of PCT/JP2012/076626 dated Jan. 15, 2013 [PCT/ISA/210].

*Primary Examiner* — Yosef K Laekemariam
(74) *Attorney, Agent, or Firm* — Sughrue Mion, PLLC; Richard C. Turner

(57) ABSTRACT

A sound quality adjustment apparatus of an approaching vehicle audible system that generates a signal of a notification sound, which is emitted from a sounding device provided in an electric vehicle that generates at least part of driving force by use of a motor to the outside of the electric vehicle, is provided with a sound element storage unit that stores sound element data forming an element of the notification sound; a sound-source sound quality extraction unit that analyzes the sound element data so as to extract a characteristic value related to the sound quality of a sound element; a parameter setting unit that obtains a parameter for converting the sound element data in accordance with vehicle information, by use of the characteristic value extracted by the sound-source sound quality extraction unit;

(Continued)

and a parameter storage unit that stores the parameter obtained by the parameter setting unit.

19 Claims, 21 Drawing Sheets

(56) References Cited

FOREIGN PATENT DOCUMENTS

| JP | 2011-246121 A | | 12/2011 | |
|---|---|---|---|---|
| JP | 2012-166662 | * | 6/2012 | ............... B60Q 5/00 |
| JP | 2012-166662 A | | 9/2012 | |

* cited by examiner

| VEHICLE SPEED | 0km/h | 5km/h | 10km/h | 15km/h | 20km/h | 25km/h |
|---|---|---|---|---|---|---|
| PITCH PARAMETER | Pitch_min | 1 | 1.2 | 1.4 | 1.6 | Pitch_max |

| VEHICLE SPEED | 0km/h | 5km/h | 10km/h | 15km/h | 20km/h | 25km/h |
|---|---|---|---|---|---|---|
| VOLUME PARAMETER | Level_min | 0.3 | 0.5 | 0.7 | 0.9 | Level_max |

FIG. 10

SOUND QUALITY ADJUSTMENT APPARATUS OF APPROACHING VEHICLE AUDIBLE SYSTEM, APPROACHING VEHICLE AUDIBLE SYSTEM SIMULATOR, AND APPROACHING VEHICLE AUDIBLE SYSTEM

CROSS REFERENCE TO RELATED APPLICATIONS

This application is a National Stage of International Application No. PCT/JP2012/076626, filed Oct. 15, 2012, the contents of which are incorporated herein by reference in its entirety.

TECHNICAL FIELD

The present invention relates to sound quality adjustment for an approaching vehicle audible system that generates, in a high-quietness electric vehicle such as a hybrid automobile or an electric automobile, a notification sound for notifying a pedestrian or the like of the existence of the electric vehicle by use of the sound.

BACKGROUND ART

In recent years, as various kinds of movable bodies, vehicles such as an electric motorcycle, an electric automobile, and the like have been electrified after development and practical realization of an electric bicycle, an electric cart, and the like. Specifically, while replacing an automobile that utilizes an internal combustion engine as its driving power source, a hybrid automobile, which utilizes a gasoline engine and an electric motor as its driving power source, an electric automobile, which utilizes, as its driving power source, an electric motor that operates with a domestic electric power source or a battery to be charged through an electric charger installed at a gas station or an electric power supply station, and a fuel cell automobile, which travels while generating electricity through a fuel cell that utilizes hydrogen gas or the like, as a fuel, have sequentially been developed; a hybrid automobile, an electric automobile, and the like have already been put to practical use and have started to spread.

In the case of each of a gasoline vehicle, a diesel vehicle, and a motorcycle (hereinafter, described as "a conventional automobile and the like") that each utilize a conventional internal combustion engine as the driving power source therefor, an engine sound and an exhaust sound, which are emitted by the driving power source itself, and road noise or the like during its travel are generated; therefore, a pedestrian walking in a town, a cyclist, or the like can be aware of approach of a vehicle through an engine sound, an exhaust sound, or the like. However, because during a low-speed travel, a hybrid automobile travels mainly by means of not an engine but an electric motor, no engine sound or exhaust sound is generated, and an electric automobile, a fuel cell automobile, and the like each travel by means of an electric motor in the whole driving region; thus, any one of these automobiles is extremely high-quietness electric vehicle. In this regard, however, a pedestrian or a cyclist in the vicinity of such a high-quietness electric vehicle cannot perceive through a sound an approach of the electric vehicle such as a hybrid automobile, an electric automobile, or a fuel cell automobile that travels by means of a less-sound-noise and high-quietness electric motor; therefore, this may become the cause of a minor collision between the high-quietness electric vehicle and the pedestrian or the like.

Accordingly, in order to solve the foregoing problem in which the quietness, which is originally a merit of each of a hybrid automobile, a fuel cell automobile, and an electric automobile, provides an adverse effect from time to time, there have been proposed various kinds of approaching vehicle audible systems, other than a horn that is provided in a conventional automobile or the like and sounds an alarm in accordance with the will of a driver, that are to notify a pedestrian in the vicinity of a reference vehicle of the existence of the reference vehicle (for example, Patent Documents 1 and 2).

In an approaching vehicle audible system, a filter or the like is applied to a sound element utilized as a sound source, in accordance with an accelerator opening degree or a vehicle speed, so as to change a sound element signal and hence control the sound quality in order to obtain a natural notification sound.

Meanwhile, sound elements are prepared mainly by automobile manufacturers and differ depending on the kinds of automobiles. Therefore, it is required to adjust a filter or the like for each of various kinds of sound elements. Moreover, in the case where the sound quality that has been set by default by an automobile manufacturer is not preferable one for a driver, no device for simply adjusting the sound quality is prepared even though the driver wants to adjust it.

PRIOR ART REFERENCE

Patent Document

[Patent Document 1] Japanese Patent Application Laid-Open No. 2011-207390
[Patent Document 2] Japanese Patent Application Laid-Open No. 2001-290489

DISCLOSURE OF THE INVENTION

Problems to be Solved by the Invention

In the case of the approaching vehicle audible system disclosed in each of Patent Documents 1 and 2, it is argued that harmonic components are created from the peak frequency of a sound source so as to raise the pleasant-sound performance and the recognition performance; however, when the sound quality of a sound element changes, it is required to change each of the parameters. However, because there exist a great number of changeable parameters and hence a trial-and-error adjustment is required, the adjustment is extremely complicated.

The present invention is to solve the foregoing problems; the objective thereof is to provide a sound quality adjustment apparatus that can simply adjust sound quality even when the sound qualities of sound elements differ from one another. Another objective thereof is to provide an approaching vehicle audible system that can simply adjust default sound quality to preferable sound quality.

Means for Solving the Problems

In the present invention, a sound quality adjustment apparatus of an approaching vehicle audible system that generates a signal of a notification sound, which is emitted from a sounding device provided in an electric vehicle that generates at least part of driving force by use of a motor to the outside of the electric vehicle, is provided with a sound element storage unit that stores sound element data forming an element of the notification sound; a sound-source sound quality extraction unit that analyses the sound element data so as to extract a characteristic value related to the sound quality of a sound element; a parameter setting unit that obtains a parameter for converting the sound element data in accordance with vehicle information on the electric vehicle, by use of the characteristic value extracted by the sound-source sound quality extraction unit; and a parameter storage unit that stores the parameter obtained by the parameter setting unit.

Advantage of the Invention

The present invention makes it possible to provide a sound quality adjustment apparatus that can simply adjust sound quality even when the sound qualities of sound elements differ from one another.

BRIEF DESCRIPTION OF THE DRAWINGS

FIG. 10 is a table representing a format of a volume parameter in a parameter table to be stored in the parameter storage unit 81 in the sound quality adjustment apparatus of the approaching vehicle audible system according to Embodiment 1 of the present invention;

BEST MODE FOR CARRYING OUT THE INVENTION

Embodiment 1

Figure 1:
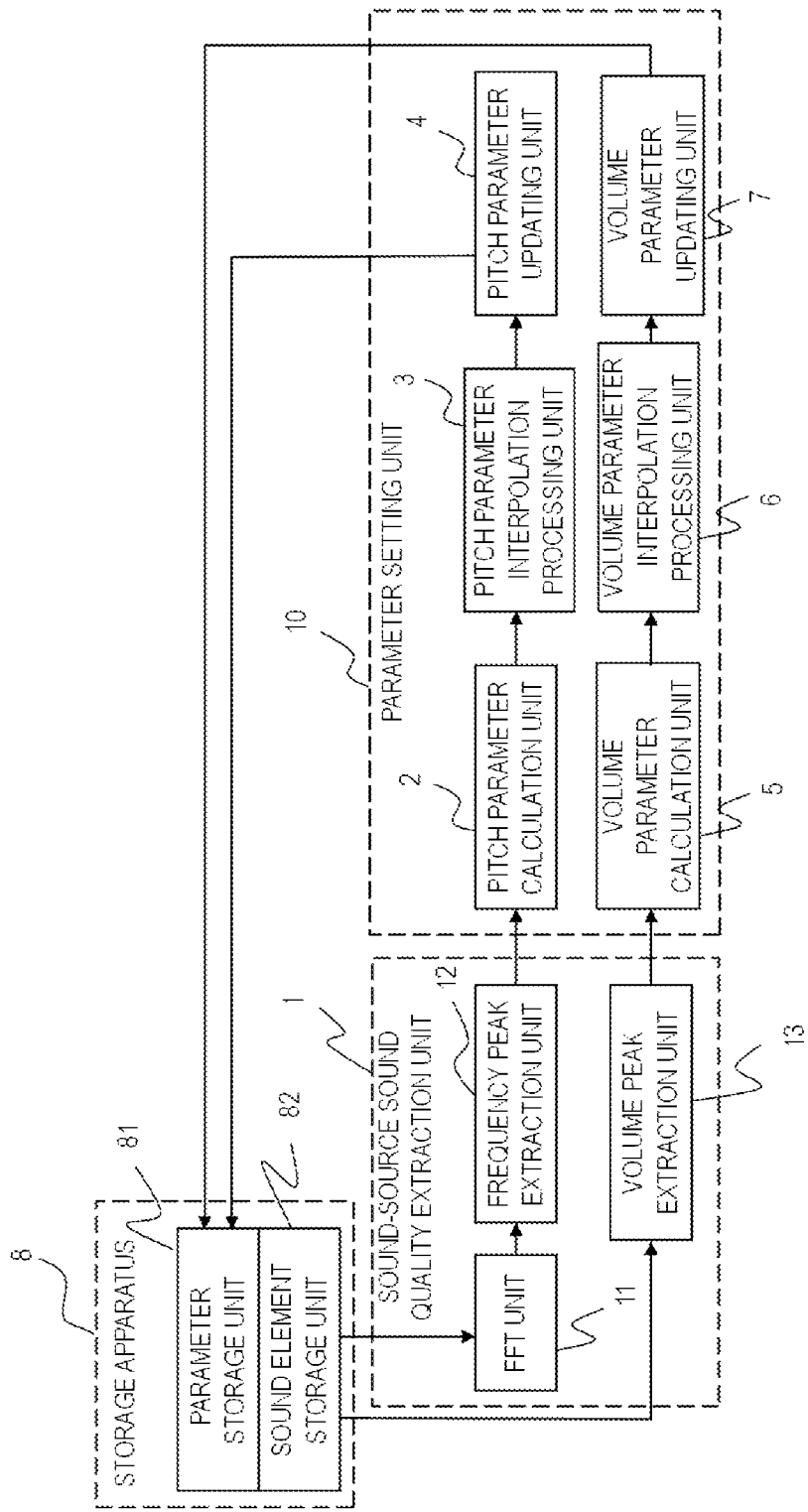
FIG. 1 is a block diagram representing the configuration of a sound quality adjustment apparatus of an approaching vehicle audible system according to Embodiment 1 of the present invention.
Figure 2:
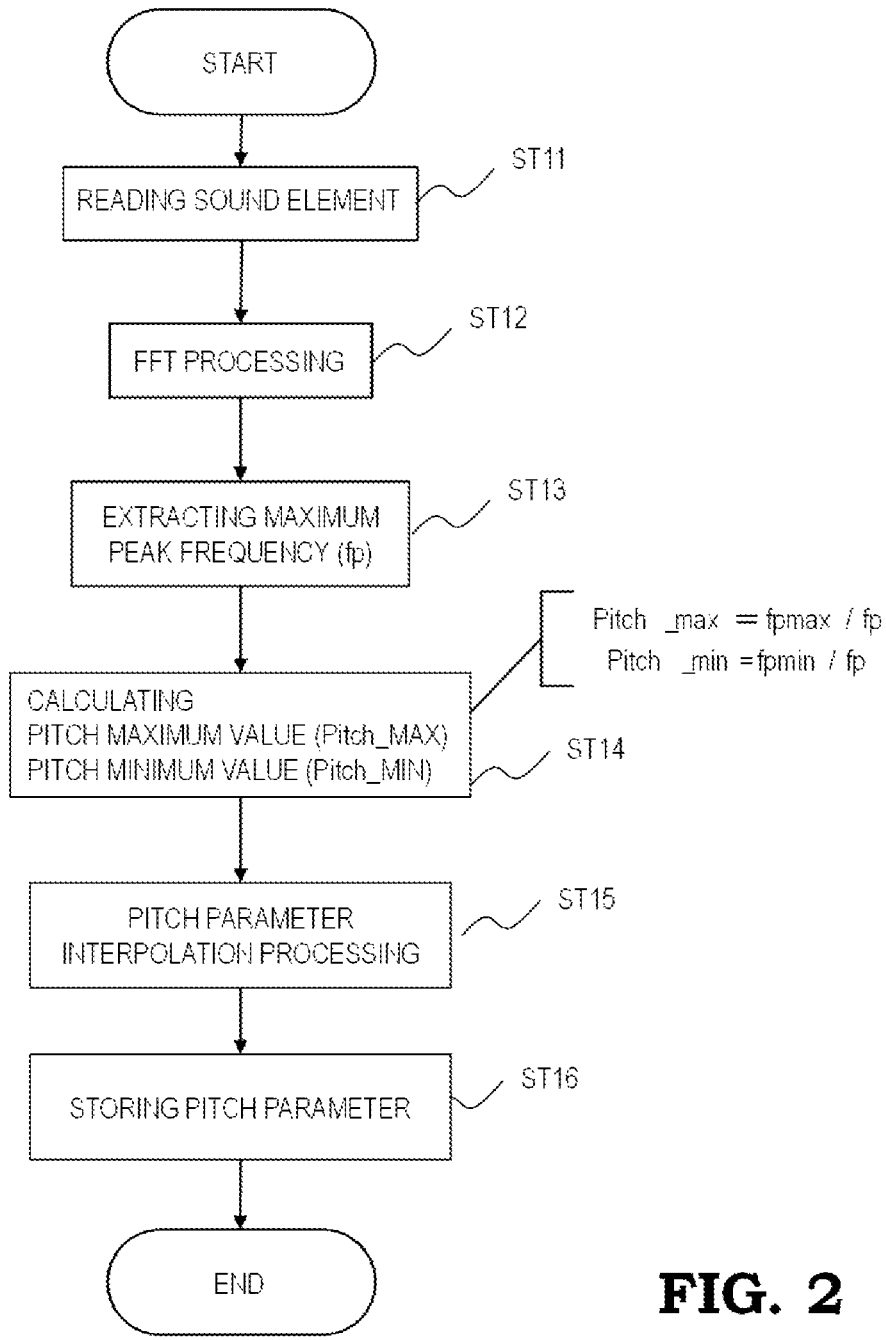
FIG. 2 is a flowchart representing the flow of calculating pitch parameters in the sound quality adjustment apparatus of the approaching vehicle audible system according to Embodiment 1 of the present invention.
Figure 3:
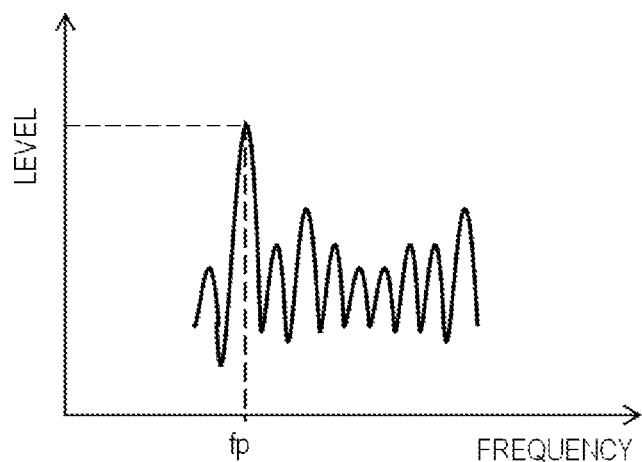
FIG. 3 is a graph representing an example of signal waveform of a sound element to which FFT processing has been applied.

FIG. 1 is a block diagram representing the configuration of a sound quality adjustment apparatus of an approaching vehicle audible system according to Embodiment 1 of the present invention. FIG. 2 is a flowchart representing the flow of calculating pitch parameters in the sound quality adjustment apparatus of the approaching vehicle audible system according to Embodiment 1 of the present invention. An approaching vehicle audible system is a system for emitting a notification sound to the outside of an electric vehicle, such as a hybrid automobile or an electric automobile, that generates at least part of its driving force by use of a motor. An FFT unit 11 in a sound-source sound quality extraction unit 1 reads a corresponding sound element stored in a sound element storage unit 82 of a storage apparatus 8 (ST11) and then performs FFT (Fast Fourier Transform) processing (ST12). A sound element denotes a loop sound obtained by storing predetermined-time digital sound data produced, for example, through a PCM (Pulse-code Modulation), as sound data to be included in a notification sound that is generated by an approaching vehicle audible system. The predetermined time is a short time, for example, one second in which the sound element can be recognized as a sound. The sound element is not limited to the one that makes a conventional engine sound imagined; it may be an arbitrary sound such as a sinusoidal sound, a white-noise sound, or a melody sound. A frequency peak extraction unit 12 of the sound-source sound quality extraction unit 1 extracts the frequency of the maximum peak, i.e., a maximum peak frequency (fp) from the frequency distribution waveform of a sound element that has been FFT-processed by the FFT unit 11 (ST13). FIG. 3 represents an example of the frequency distribution waveform of a sound element that has been FFT-processed by the FFT unit 11.

Next, a pitch parameter calculation unit 2 of a parameter setting unit 10 calculates a pitch maximum value Pitch_max and a pitch minimum value Pitch_min by use of the maximum peak frequency fp extracted by the frequency peak extraction unit 12 (ST14). For the purpose of calculating the pitch maximum value Pitch_max and the pitch minimum value Pitch_min by use of the maximum peak frequency fp, the following equations, for example, can be utilized.

$$\text{Pitch\_max} = f p \text{max} / f p$$

$$\text{Pitch\_min} = f p \text{min} / f p$$

where fpmax is a highest frequency up to which the maximum peak frequency fp is allowed to deviate at a time when sound element data is converted by use of the pitch maximum value Pitch_max, and fpmin is a lowest frequency down to which the maximum peak frequency fp is allowed to deviate at a time when the sound element data is converted by use of the pitch minimum value Pitch_min. These frequencies fpmax and fpmin are preliminarily given constants. For example, because it is said that an aged person has a difficulty in hearing a sound of 4 kHz or higher, fpmax may be set to 4 kHz; alternatively, in accordance with the configuration of an approaching vehicle audible system, fpmax may be set to the half of the sampling frequency. The frequency fpmin may be set to a frequency within the reproduction frequency bandwidth of a sound device in accordance with the configuration of an approaching vehicle audible system. Next, a pitch parameter interpolation processing unit 3 of the parameter setting unit 10 performs interpolation processing for a section between the pitch maximum value Pitch_max and the pitch minimum value Pitch_min calculated by the pitch parameter calculation unit 2 in such a way that a pitch parameter changes based on vehicle information such as a vehicle speed (ST15).

Figure 4:
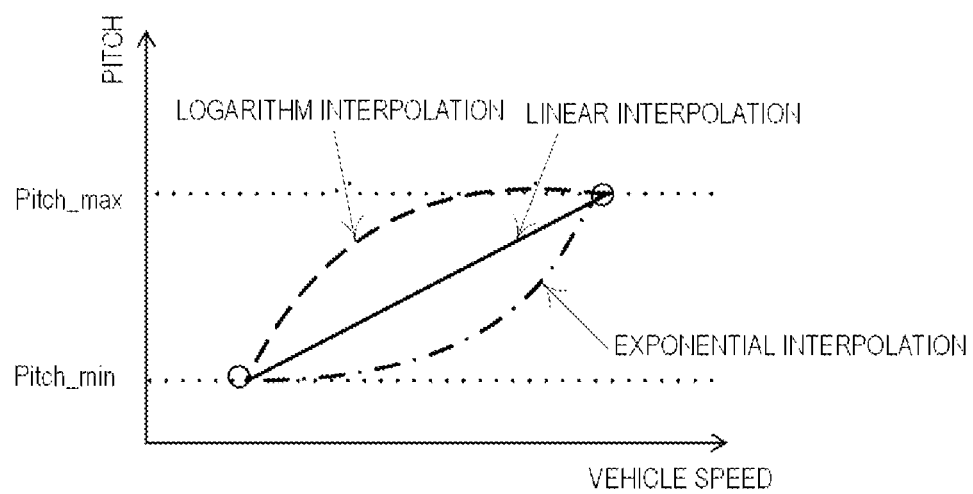
FIG. 4 is a graph representing an example of interpolation processing in a pitch parameter interpolation processing unit 3 in the sound quality adjustment apparatus of the approaching vehicle audible system according to Embodiment 1 of the present invention.

FIG. 4 represents an example of interpolation processing at a time when the vehicle information is a vehicle speed. As represented in FIG. 4, the section between the pitch maximum value Pitch_max and the pitch minimum value Pitch_min may be obtained through linear interpolation that changes in proportion to vehicle information such as a vehicle speed, through logarithm interpolation that saturates as the vehicle information changes, or through exponential interpolation that drastically changes as the vehicle information varies.

Figures 5, 6:
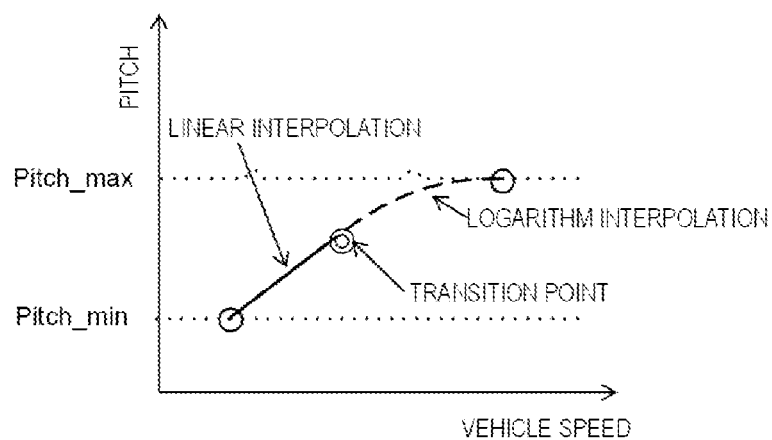
FIG. 5 is a graph representing another example of interpolation processing in the pitch parameter interpolation processing unit 3 in the sound quality adjustment apparatus of the approaching vehicle audible system according to Embodiment 1 of the present invention.
FIG. 6 is a table representing a format of a pitch parameter in a parameter table to be stored in a parameter storage unit 81 in the sound quality adjustment apparatus of the approaching vehicle audible system according to Embodiment 1 of the present invention.

The interpolation processing may not be implemented by a single and the same interpolation method for the whole section; different interpolation methods may be utilized for the pre-transition and post-transition sections. FIG. 5 represents interpolation processing at a time when there exists a transition point. As represented in FIG. 5, it may be allowed that the section between the minimum value and the transition point is obtained through linear interpolation and the section between the transition point and the maximum value is obtained through logarithm interpolation; a plurality of transition points may exist.

Next, a pitch parameter updating unit 4 of the parameter setting unit 10 creates a parameter table with a format conforming to the configuration of the corresponding approaching vehicle audible system, for the pitch parameter interpolated by the pitch parameter interpolation processing unit 3, and the created parameter table replaces the parameter table that has been stored in the parameter storage unit 81 of the storage apparatus 8 and is stored in the parameter storage unit 81 (ST16). FIG. 6 represents an example of format of the pitch parameter for a parameter table to be stored in the parameter storage unit 81. As represented in FIG. 6, it is only necessary to store in the parameter storage unit 81 a table-type parameter table in which the value of vehicle information and the value of the corresponding pitch parameter make a pair.

Figure 7:
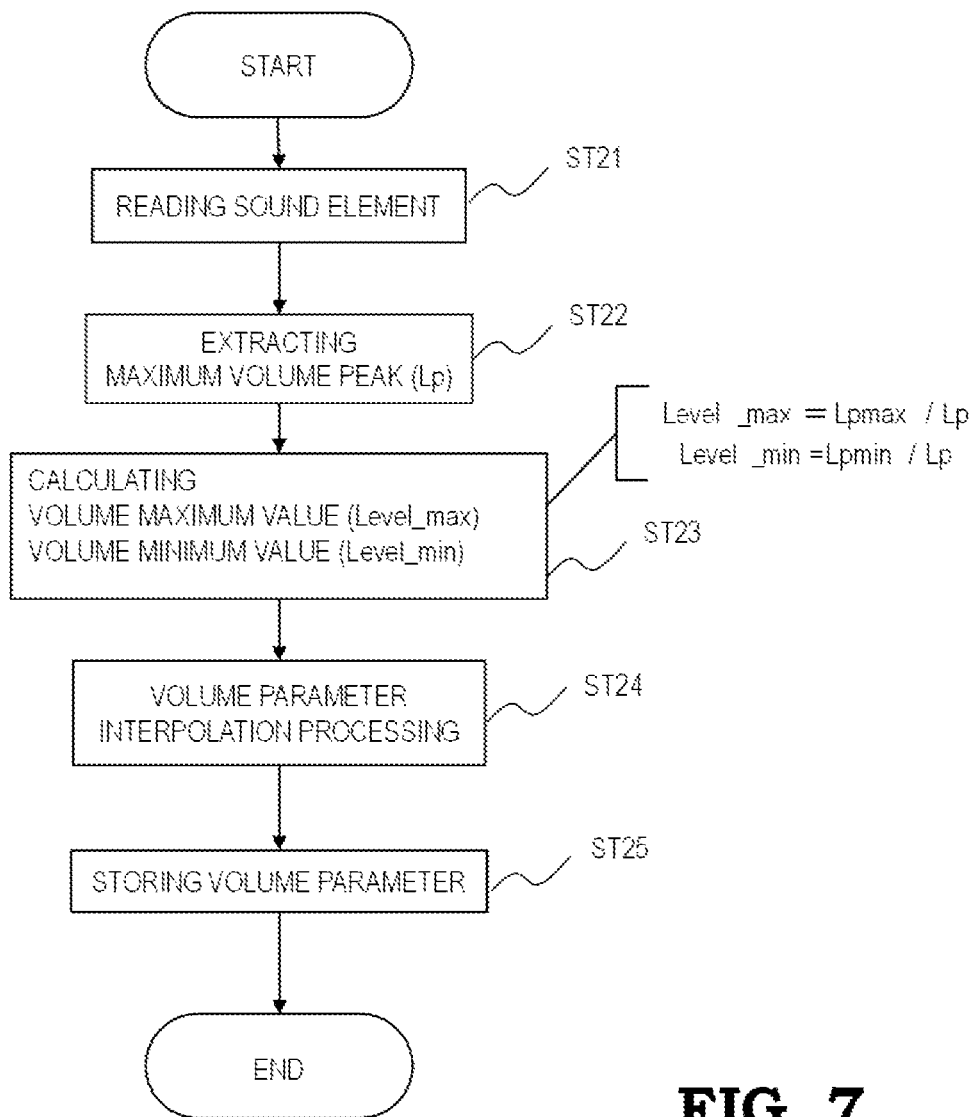
FIG. 7 is a flowchart representing the flow of calculating volume parameters in the sound quality adjustment apparatus of the approaching vehicle audible system according to Embodiment 1 of the present invention.

Next, calculation of a volume parameter will be explained. FIG. 7 is a flowchart representing the flow of calculating volume parameters in the sound quality adjustment apparatus of the approaching vehicle audible system according to Embodiment 1 of the present invention. A volume peak extraction unit 13 in the sound-source sound quality extraction unit 1 reads a corresponding sound element stored in the sound element storage unit 82 of the storage apparatus 8 (ST21) and then extracts a maximum volume peak Lp of sample data (ST22). The volume peak Lp to be extracted by the volume peak extraction unit 13 may be an average volume peak at which the average volume, which is a constant-period average value of sample data, reaches its peak. Next, a volume parameter calculation unit 5 of the parameter setting unit 10 calculates a volume maximum value Level_max and a volume minimum value Level_min by use of the volume peak Lp (maximum volume peak or average volume peak) extracted by the volume peak extraction unit 13 of the sound-source sound quality extraction unit 1 (ST23). In the case where the volume maximum value Level_max and the volume minimum value Level_min are calculated by use of the volume peak Lp, the following equations, for example, can be utilized.

$$\text{Level\_max} = L p \text{max} / L p$$

$$\text{Level\_min} = L p \text{min} / L p 1$$

where Lpmax denotes a maximum volume at a time when sound element data is converted by use of the volume maximum value Level_max; Lpmin denotes a minimum volume at a time when sound element data is converted by use of the volume minimum value Level_min; both Lpmax and Lpmin are preliminarily given constants. For example, Lpmax may be set to as large as the noise level of a gasoline engine vehicle; Lpmin may be set to as small as can be heard in a downtown area.

Figure 8:
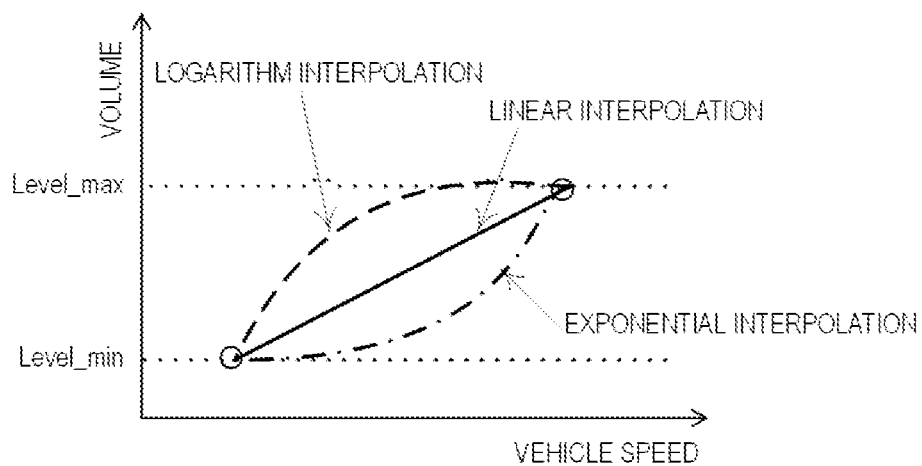
FIG. 8 is a graph representing an example of interpolation processing in a volume parameter interpolation processing unit in the sound quality adjustment apparatus of the approaching vehicle audible system according to Embodiment 1 of the present invention.

Next, a volume parameter interpolation processing unit 6 of the parameter setting unit 10 performs interpolation processing for a section between the volume maximum value Level_max and the volume minimum value Level_min calculated by the volume parameter calculation unit 5 in such a way that a volume parameter changes based on vehicle information such as a vehicle speed (ST24). FIG. 8 represents an example of interpolation processing. As represented in FIG. 8, the section between the volume maximum value Level_max and the volume minimum value Level_min may be obtained through linear interpolation that changes in proportion to vehicle information, through logarithm interpolation that saturates as the vehicle information changes, or through exponential interpolation that drastically changes as the vehicle information varies.

Figure 9:
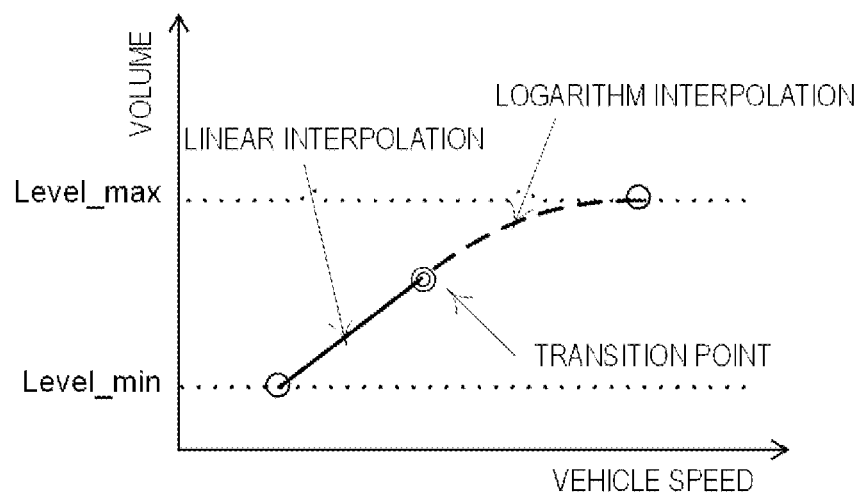
FIG. 9 is a graph representing another example of interpolation processing in the volume parameter interpolation processing unit in the sound quality adjustment apparatus of the approaching vehicle audible system according to Embodiment 1 of the present invention.

Moreover, the interpolation processing may have a transition point in the section between the minimum value and the maximum value. FIG. 9 represents an interpolation method at a time when there exists a transition point. As represented in FIG. 9, it may be allowed that the section between the minimum value and the transition point is obtained through linear interpolation and the section between the transition point and the maximum value is obtained through logarithm interpolation; a plurality of transition points may exist.

Next, a volume parameter updating unit 7 of the parameter setting unit 10 creates a parameter table with a format conforming to the configuration of the corresponding approaching vehicle audible system, for the volume parameter interpolated by the volume parameter interpolation processing unit 6, and the created parameter table replaces the parameter table that has been stored in the parameter storage unit 81 of the storage apparatus 8 and is stored in the parameter storage unit 81 (ST25). FIG. 10 represents an example of format of the volume parameter for a parameter table to be stored in the parameter storage unit 81. As represented in FIG. 10, it is only necessary to store in the parameter storage unit 81 with a table-type parameter table in which the value of vehicle information and the value of the corresponding volume parameter make a pair.

Figure 11:
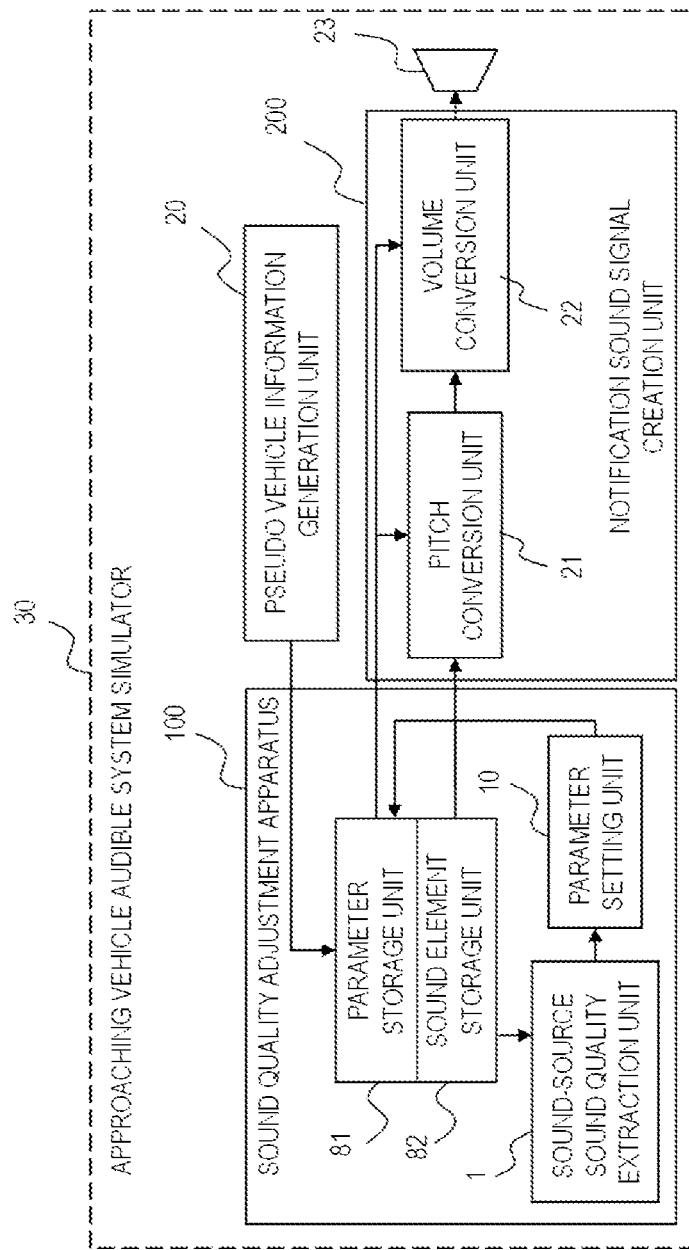
FIG. 11 is a block diagram representing the configuration of an approaching vehicle audible system simulator utilizing the sound quality adjustment apparatus of the approaching vehicle audible system according to Embodiment 1 of the present invention.

The foregoing sound quality adjustment apparatus of the approaching vehicle audible system is to be integrated in the approaching vehicle audible system; however, the sound quality adjustment apparatus may be integrated in an approaching vehicle audible system simulator so as to be utilized as a design tool for the approaching vehicle audible system. The approaching vehicle audible system simulator will be explained hereinafter. FIG. 11 is a block diagram representing an example of the configuration of an approaching vehicle audible system simulator. An approaching vehicle audible system simulator 30 includes the sound quality adjustment apparatus 100 illustrated in FIG. 1, a notification sound signal creation unit 200 having a pitch conversion unit 21 and a volume conversion unit 22, and a pseudo vehicle information generation unit 20. The pseudo vehicle information generation unit 20 stores pseudo vehicle information simulating vehicle information such as a vehicle speed at a time when an electric vehicle practically travels, and generates and outputs the pseudo vehicle information, as may be necessary. The approaching vehicle audible system simulator 30 is configured for the purpose that in the sound quality adjustment apparatus 100, a sound element stored in the sound element storage unit 82 is converted by the pitch conversion unit 21 and the volume conversion unit 22 by use of the pitch parameter and the volume parameter stored in the parameter storage unit 81 so that a notification sound signal is created and for the purpose that a notification sound is generated by a sounding device 23 such as a speaker and the sound quality of the notification sound is ascertained.

The pitch conversion unit 21 receives a pitch parameter that corresponds to vehicle information outputted from the pseudo vehicle information generation unit 20 and is transmitted from the parameter storage unit 81, converts the sound signal of a sound element, and outputs the converted sound signal. Explaining with an example of pitch parameter table in FIG. 6, in the case where the pseudo vehicle information generation unit 20 outputs a vehicle speed 5 km/h, the parameter storage unit 81 outputs "1" as the pitch parameter. When the pitch parameter is 1.0, the pitch conversion unit 21 directly outputs the sound element data, without changing the pitch of the sound element signal, i.e., the sound pitch. For example, when an original sound element is data for one second, one-second data is created from the original sound element and the one-second data is outputted as sound data to be repeated. When the vehicle speed increases and "10 km/h" is outputted, the parameter storage unit 81 outputs "1.2", as the pitch parameter. In order to obtain a pitch that is 1.2 times as high as the original pitch, the original data is thinned with a rate of 1/1.2; that is to say, when the original sound element is data for one second, 1/1.2-second data is created from the original sound element and the 1/1.2-second data is outputted as sound data to be repeated. The foregoing processing makes the pitch conversion unit 21 output a notification sound signal whose peak frequency varies from fpmin to fpmax as the vehicle information changes.

Similarly, the volume conversion unit 22 receives the volume parameter that corresponds to vehicle information outputted from the pseudo vehicle information generation unit 20 and is transmitted from the parameter storage unit 81, and then changes the volume, i.e., the amplitude of sound data outputted from the pitch conversion unit 21 by use of the received volume parameter, as a magnification ratio. The foregoing processing makes the volume conversion unit 22 output a notification sound signal whose volume peak varies from Lpmin to Lpmax as the vehicle information changes. In such a way as described above, based on the sound data that is sound element data outputted after being converted by the pitch conversion unit 21 and the volume conversion unit 22, the sounding device 23 generates a notification sound; then, the sound quality of the notification sound is ascertained.

Heretofore, an example in which both the pitch and the volume are converted has been explained; however, only any one of the pitch and the volume may be converted. For example, in the case where only the pitch is converted, the sound-source sound quality extraction unit 1 is not provided with the volume peak extraction unit 13, and the parameter setting unit 10 is provided with none of the volume parameter calculation unit 5, the volume parameter interpolation processing unit 6, and the volume parameter updating unit 7. In the above description, an example in which vehicle information is a vehicle speed has been explained; however, the vehicle information is not limited to a vehicle speed, and the rotation speed of a motor, an acceleration opening degree, or the like may be utilized. Only any one of the pitch and the volume may be converted; it is also applied to the following embodiments that the vehicle information may be other than a vehicle speed.

As described above, in the present invention, the sound-source sound quality extraction unit 1 analyses sound element data stored in the sound element storage unit 82 and extracts characteristic values, such as the frequency peak and the volume peak, that are related to the sound quality of a sound element; then, by use of the characteristic values that have been extracted by the sound-source sound quality extraction unit 1 and are related to the sound quality of a sound element, the parameter setting unit 10 obtains parameters for converting the sound element data based on vehicle information of an electric vehicle. This configuration makes it possible to provide a sound quality adjustment apparatus, of an approaching vehicle audible system, that can simply adjust the sound quality of a sound element even when the sound quality is changed. The approaching vehicle audible system simulator explained heretofore can also be integrated, for example, as an adjustment tool, in a personal computer.

Embodiment 2

Figure 12:
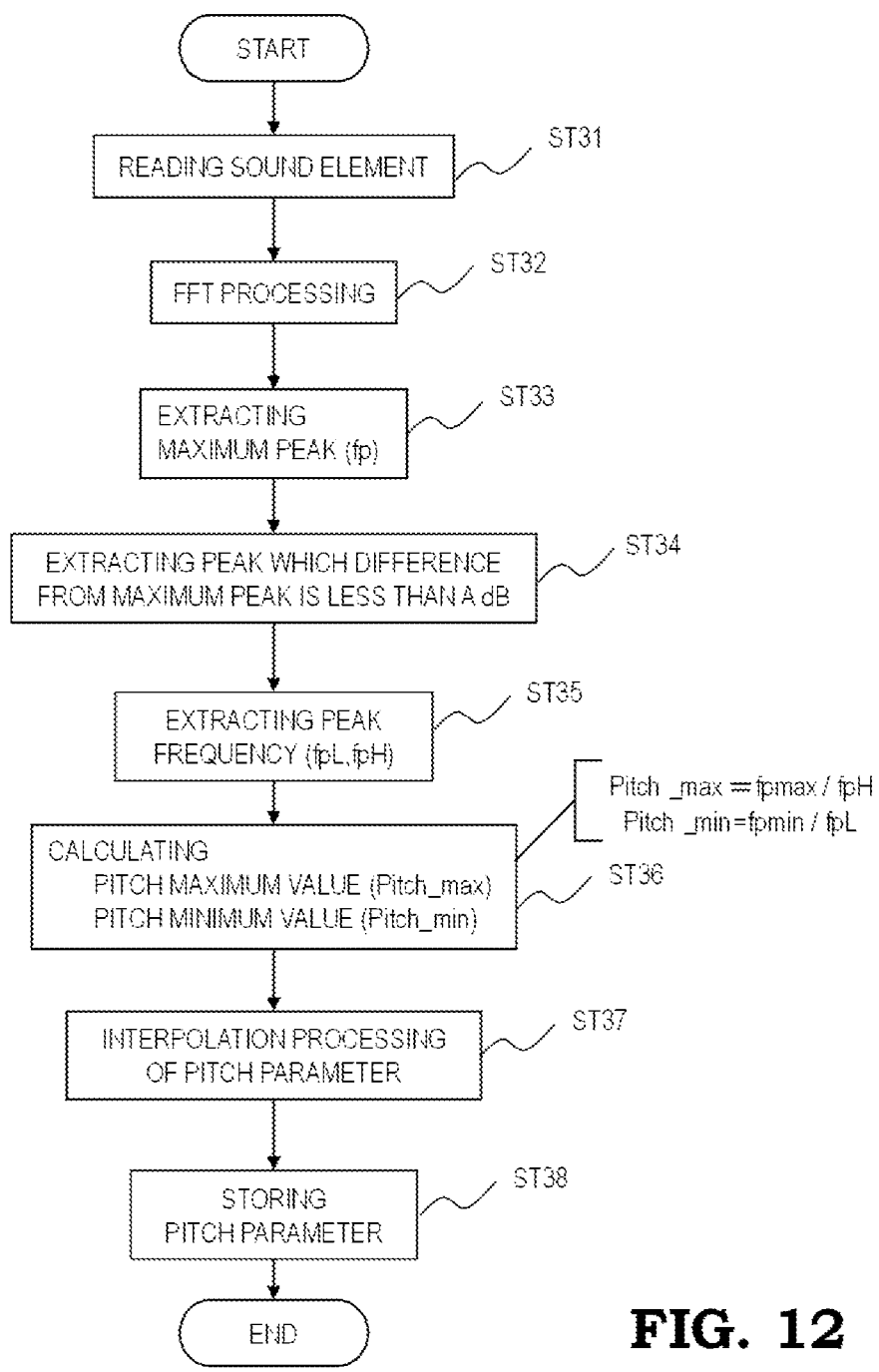
FIG. 12 is a flowchart representing the flow of calculating pitch parameters in the sound quality adjustment apparatus of the approaching vehicle audible system according to Embodiment 2 of the present invention.
Figure 13:
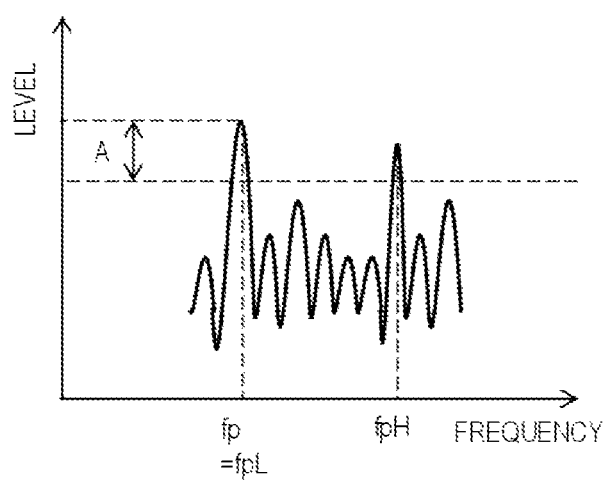
FIG. 13 is a graph representing another example of signal waveform of a sound element to which FFT processing has been applied.

FIG. 12 is a flowchart representing the flow of calculating pitch parameters in a sound quality adjustment apparatus of an approaching vehicle audible system according to Embodiment 2 of the present invention. The configuration thereof is the same as that in FIG. 1. The FFT unit 11 in the sound-source sound quality extraction unit 1 reads a corresponding sound element stored in the sound element storage unit 82 of the storage apparatus 8 (ST31) and then performs FFT processing (ST32). FIG. 13 represents an example, other than that in FIG. 3, of the frequency distribution waveform of a sound element that has been FFT-processed by the FFT unit 11. The frequency peak extraction unit 12 of the sound-source sound quality extraction unit 1 extracts the maximum peak frequency fp, at which the peak becomes maximum, from the frequency distribution waveform of a sound element that has been FFT-processed by the FFT unit 11 (ST33). Next, the frequency peak extraction unit 12 extracts peaks, the difference of each of which from the maximum peak is the same as or smaller than a reference value A (dB) (ST34), and then extracts, as a low-frequency-side peak frequency fpL, the frequency of a peak, among a plurality of peaks including the maximum peak, that exists at the lowest frequency side and, as a high-frequency-side peak frequency fpH, the frequency of a peak that exists at the highest frequency side (ST35).

Next, the pitch parameter calculation unit 2 calculates the pitch maximum value Pitch_max and the pitch minimum value Pitch_min by use of the peak frequencies fpL and fpH extracted by the frequency peak extraction unit 12 of the sound-source sound quality extraction unit 1 (ST36). For the purpose of calculating the pitch maximum value Pitch_max and the pitch minimum value Pitch_min by use of the peak frequencies fpL and fpH, the following equations, for example, can be utilized.

Pitch_max=$fpmax/fpH$

Pitch_min=$fpmin/fpL$ where fpmax is the highest frequency up to which the high-frequency-side peak frequency fpH is allowed to deviate at a time when sound element data is converted by use of the pitch maximum value Pitch_max, and fpmin is the lowest frequency up to which the low-frequency-side peak frequency fpL is allowed to deviate at a time when the sound element data is converted by use of the pitch minimum value Pitch_min. These frequencies fpmax and fpmin are preliminarily given constants. For example, because it is said that an aged person has a difficulty in hearing a sound of 4 kHz or higher, fpmax may be set to 4 kHz; alternatively, in accordance with the configuration of an approaching vehicle audible system, fpmax may be set to the half of the sampling frequency. The frequency fpmin may be set to a frequency within the reproduction frequency bandwidth of a sound device in accordance with the configuration of an approaching vehicle audible system.

If no peak, the difference of which from the maximum peak is the same as or smaller than the reference value A (dB), exists, fpH and fpL are regarded as being equal to fp. This processing is the same as that explained in Embodiment 1.

Next, the pitch parameter interpolation processing unit 3 performs interpolation processing for a section between the pitch maximum value Pitch_max and the pitch minimum value Pitch_min calculated by the pitch parameter calculation unit 2 in such a way that a pitch parameter changes based on vehicle information such as a vehicle speed. The interpolation processing is implemented, for example, through linear interpolation, logarithm interpolation, or exponential interpolation explained with reference to FIG. 4 in Embodiment 1; alternatively, the interpolation processing may have such a transition point as explained with reference to FIG. 5.

Next, the pitch parameter updating unit 4 creates a parameter table with a format conforming to the configuration of the corresponding approaching vehicle audible system, for the pitch parameter interpolated by the pitch parameter interpolation processing unit 3, and the created parameter table replaces the parameter table that has been stored in the parameter storage unit 81 of the storage apparatus 8 and is stored in the parameter storage unit 81.

The foregoing method makes it possible to provide a sound quality adjustment apparatus that can simply adjust the sound quality even when the sound quality of a sound element is changed or even when the sound element has a plurality of frequency peaks.

Embodiment 3

Figure 14:
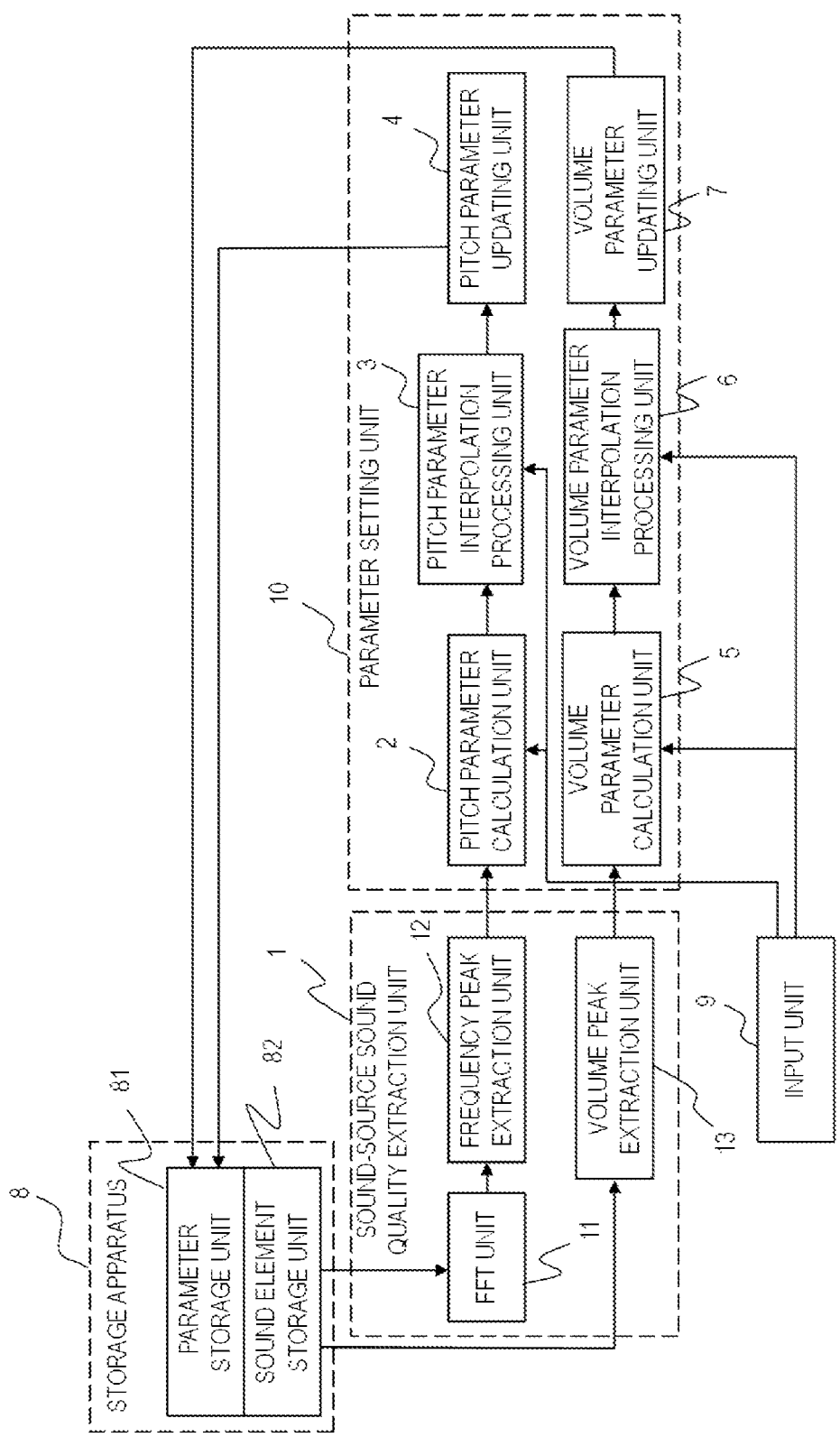
FIG. 14 is a block diagram representing the configuration of a sound quality adjustment apparatus of an approaching vehicle audible system according to Embodiment 3 of the present invention.
Figure 15:
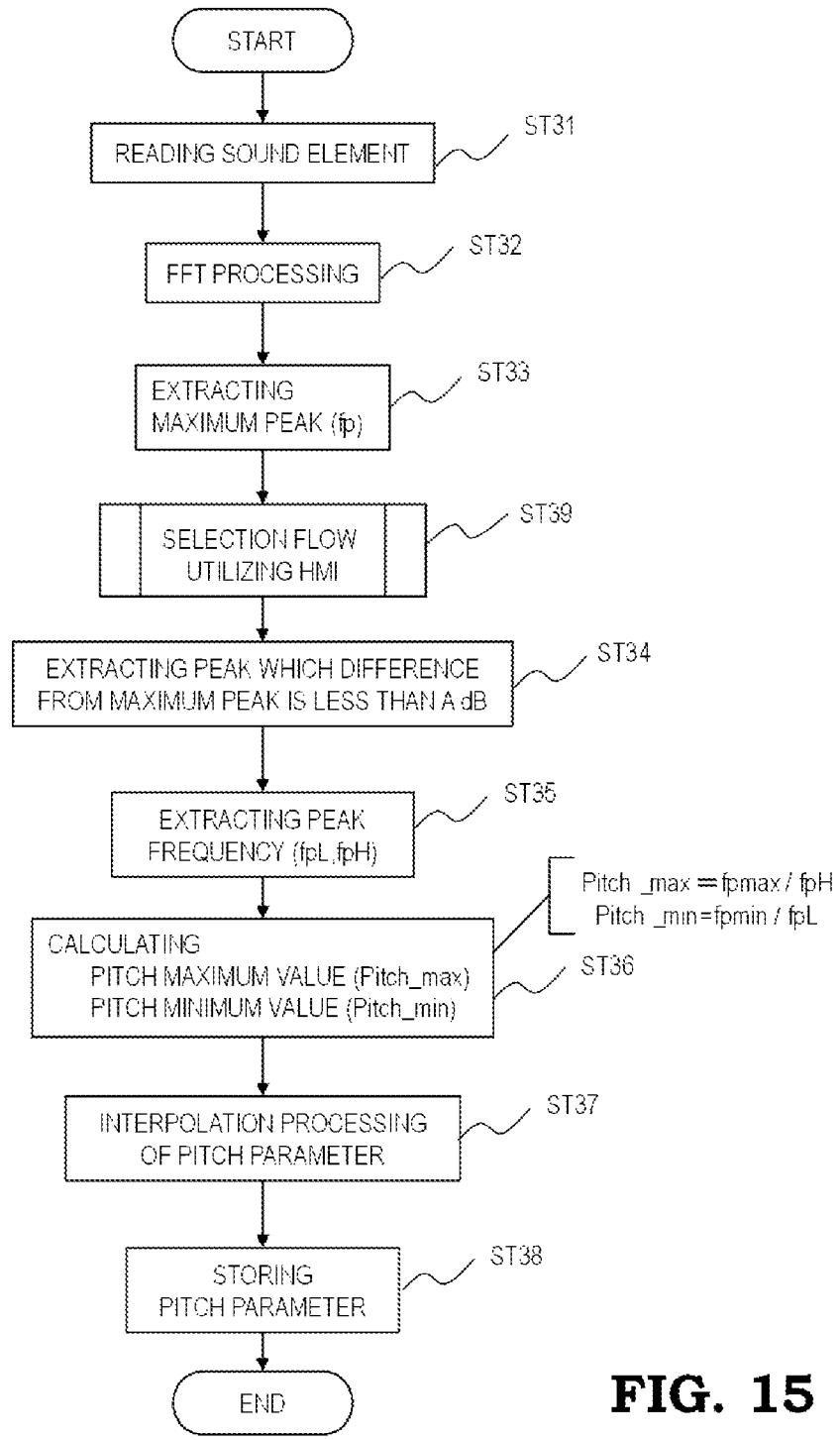
FIG. 15 is a flowchart representing the flow of calculating pitch parameters in the sound quality adjustment apparatus of the approaching vehicle audible system according to Embodiment 3 of the present invention.

FIG. 14 is a block diagram representing the configuration of a sound quality adjustment apparatus of an approaching vehicle audible system according to Embodiment 3 of the present invention. FIG. 15 is a flowchart representing the flow of calculating pitch parameters in the sound quality adjustment apparatus of the approaching vehicle audible system according to Embodiment 3 of the present invention. The FFT unit 11 in the sound-source sound quality extraction unit 1 reads a corresponding sound element stored in the sound element storage unit 82 of the storage apparatus 8 (ST31) and then performs FFT processing (ST32). The frequency peak extraction unit 12 of the sound-source sound quality extraction unit 1 extracts the maximum peak frequency fp, at which the peak becomes maximum, from the frequency distribution waveform of a sound element that has been FFT-processed by the FFT unit 11 (ST33). The foregoing processing is the same as that in Embodiment 2.

Next, the frequency peak extraction unit 12 extracts peaks, the difference of each of which from the maximum peak is the same as or smaller than the reference value A (dB) (ST34), and then refers to, as the low-frequency-side peak frequency fpL, the frequency of a peak, among a plurality of peaks including the maximum peak, that exists at the lowest frequency side and, as the high-frequency-side peak frequency fpH, the frequency of a peak that exists at the highest frequency side (ST35). Next, the pitch parameter calculation unit 2 calculates the pitch maximum value Pitch_max and the pitch minimum value Pitch_min by use of the peak frequencies fpL and fpH extracted by the frequency peak extraction unit 12 of the sound-source sound quality extraction unit 1 (ST36). For the purpose of calculating the pitch maximum value Pitch_max and the pitch minimum value Pitch_min by use of the peak frequencies fpL and fpH, the following equations, for example, can be utilized.

$$Pitch\_max = fpmax/fpH$$

$$Pitch\_min = fpmin/fpL$$

where fpmax is the highest frequency up to which the high-frequency-side peak frequency fpH is allowed to deviate at a time when sound element data is converted by use of the pitch maximum value Pitch_max, and fpmin is the lowest frequency up to which the low-frequency-side peak frequency fpL is allowed to deviate at a time when the sound element data is converted by use of the pitch minimum value Pitch_min.

Figure 16:
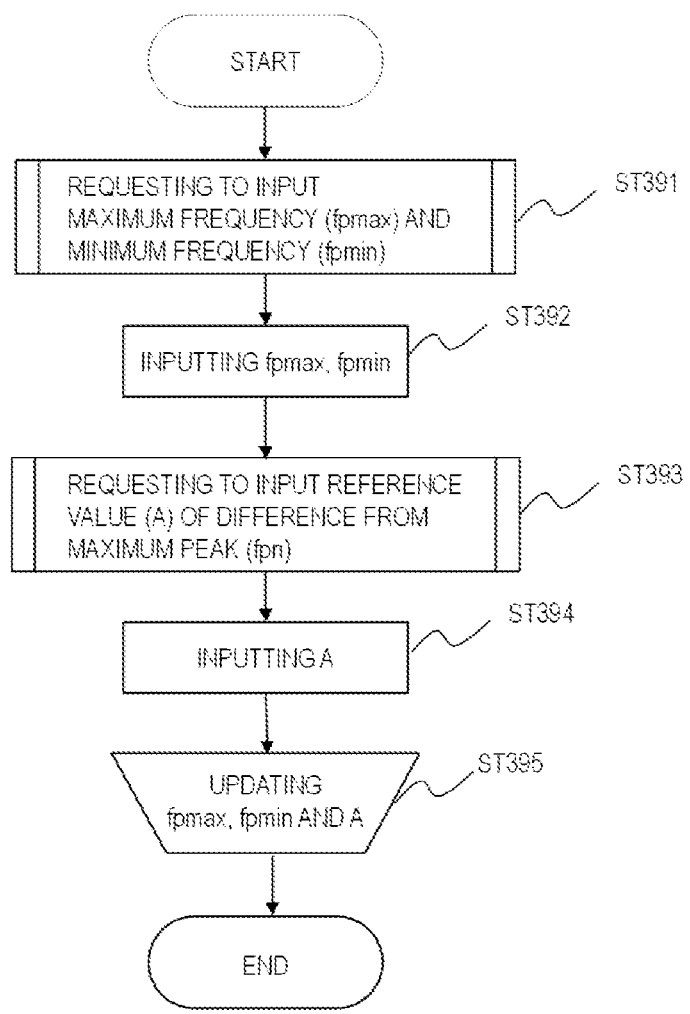
FIG. 16 is a flowchart representing an optional flow through an HMI in the flow of calculating pitch parameters in the sound quality adjustment apparatus of the approaching vehicle audible system according to Embodiment 3 of the present invention.

In Embodiment 3, the reference value A dB utilized in the step ST34 and the frequencies fpmax and fpmin utilized in the step ST36 are inputted from the input unit 9 in accordance with a selection flow (ST39) utilizing HMI. FIG. 16 represents a flow in which a user can arbitrarily set fpmax, fpmin, and A through the input unit 9. At first, the input unit 9 provides a display urging the user to input fpmax and fpmin (ST391); then, the user inputs fpmax and fpmin (ST392). In addition, the input unit 9 provides a display requesting the user to input the reference value A, as the level of a to-be-extracted peak, that is the difference from the maximum peak (ST393); then, the user inputs "A" (ST394) so as to update fpmax, fpmin, and A (ST395).

For example, because it is said that an aged person has a difficulty in hearing a sound of 4 kHz or higher, fpmax may be set to 4 kHz; alternatively, in accordance with the configuration of an approaching vehicle audible system, fpmax may be set to the half of the sampling frequency; that is to say, fpmax can freely be set by a user. In addition, fpmin may be set to a frequency within the reproduction frequency bandwidth of the sounding device in accordance with the configuration of the approaching vehicle audible system; alternatively, fpmin may be set to 1 kHz for which the sensitivity of a human ear is relatively excellent; that is to say, fpmin can freely be set by a user.

Next, the pitch parameter interpolation processing unit 3 performs interpolation processing for a section between the pitch maximum value Pitch_max and the pitch minimum value Pitch_min calculated by the pitch parameter calculation unit 2 in such a way that a pitch parameter changes based on vehicle information such as a vehicle speed (ST37). The interpolation methods for the interpolation processing include those in FIGS. 4 and 5, explained in Embodiment 1.

Figure 17:
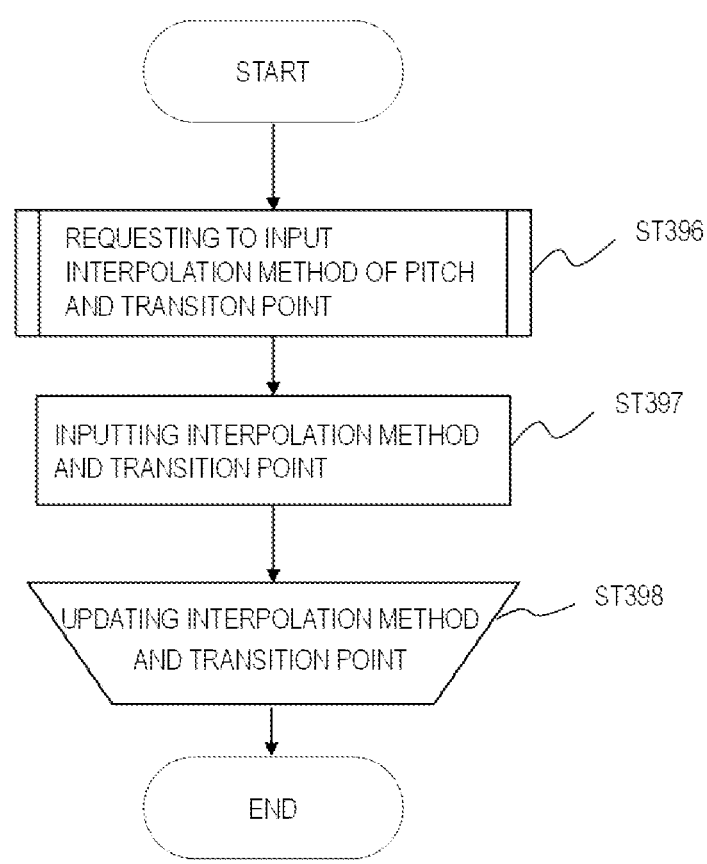
FIG. 17 is a flowchart representing an optional flow through an HMI in the flow of calculating pitch parameters in the sound quality adjustment apparatus of the approaching vehicle audible system according to Embodiment 3 of the present invention.

The interpolation method may arbitrarily be inputted by a user through the input unit 9. FIG. 17 represents a flow in which a user can arbitrarily set the interpolation method through the input unit 9. The flow may be implemented, for example, in the step ST39 in FIG. 15. At first, the input unit 9 provides a display urging the user to input the interpolation method and the transition point (ST396). In response to the contents of the display, the user inputs the interpolation method and the transition point (ST397); then, the interpolation method and the transition point are updated to those inputted by the user (ST398). In such a way as described above, it is made possible to set the interpolation method that is desired by the user.

Next, the pitch parameter updating unit 4 creates a parameter table with a format conforming to the configuration of the corresponding approaching vehicle audible system, for the pitch parameter interpolated by the pitch parameter interpolation processing unit 3, and the created parameter table replaces the parameter table that has been stored in the parameter storage unit 81 of the storage apparatus 8 and is stored in the parameter storage unit 81 (ST38).

Figure 18:
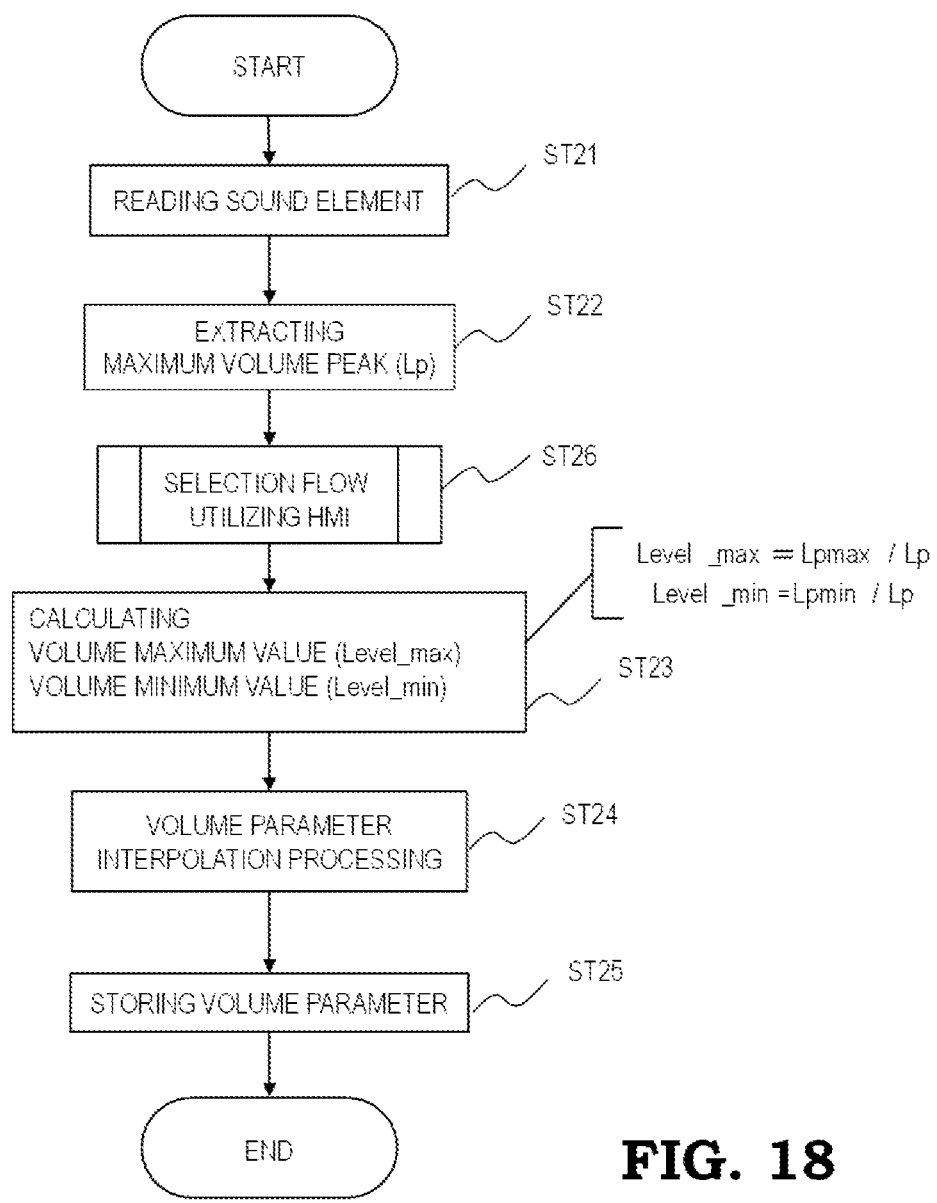
FIG. 18 is a flowchart representing the flow of calculating volume parameters in the sound quality adjustment apparatus of the approaching vehicle audible system according to Embodiment 3 of the present invention.

As described below, the volume parameter can also be calculated based on the value inputted by a user. FIG. 18 is a flowchart representing the flow of calculating volume parameters in the sound quality adjustment apparatus of the approaching vehicle audible system according to Embodiment 3 of the present invention. A volume peak extraction unit 13 in the sound-source sound quality extraction unit 1 reads a corresponding sound element stored in the sound element storage unit 82 of the storage apparatus 8 (ST21) and then extracts a maximum volume peak Lp of sample data (ST22). The volume peak extraction unit 13 may extract the maximum volume peak Lp, as a volume peak; however, the volume peak extraction unit 13 may extract an average volume peak at which the average volume, which is a constant-period average value, reaches its peak.

Figure 19:
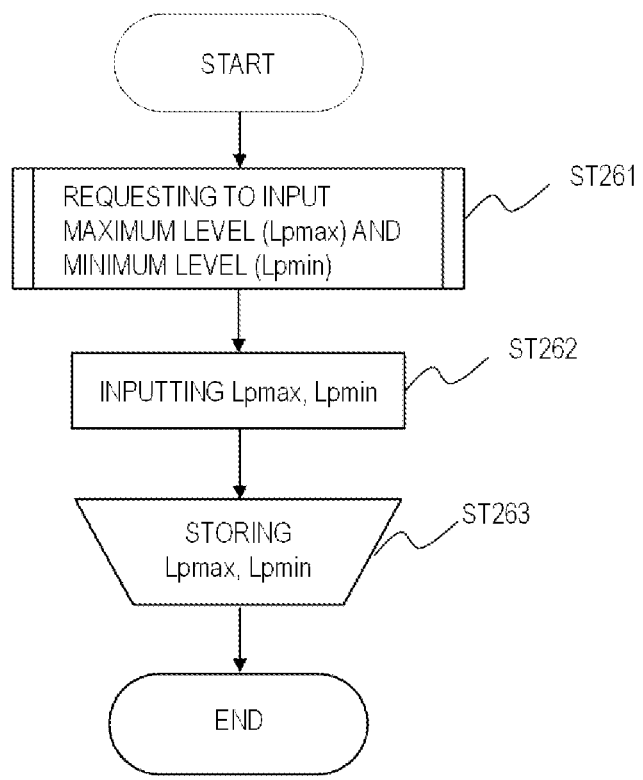
FIG. 19 is a flowchart representing an optional flow through an HMI in the flow of calculating volume parameters in the sound quality adjustment apparatus of the approaching vehicle audible system according to Embodiment 3 of the present invention.

Next, the volume parameter calculation unit 5 calculates a volume maximum value Level_max and a volume minimum value Level_min by use of the volume peak (maximum volume peak or average volume peak) Lp extracted by the volume peak extraction unit 13 of the sound-source sound quality extraction unit 1 (ST23). In the case where the volume maximum value Level_max and the volume minimum value Level_min are calculated by use of the volume peak Lp, the following equations, for example, can be utilized.

$$Level\_max = Lpmax/Lp$$

$$Level\_min = Lpmin/Lp$$

where Lpmax denotes the maximum volume at a time when sound element data is converted by use of the volume maximum value Level_max; Lpmin denotes the minimum volume at a time when the sound element data is converted by use of the volume minimum value Level_min. Lpmax and Lpmin are values that can arbitrarily be set by a user through the input unit 9 in accordance with a selection flow (ST26) utilizing HMI. FIG. 19 is a flowchart representing the detail of the HMI selection flow (ST26) in which Lpmax and Lpmin are inputted through the input unit 9. The input unit 9 provides a display urging the user to input Lpmax and Lpmin (ST261); then, the user inputs Lpmax and Lpmin (ST262). For example, Lpmax may be set to a value that is as large as can be heard in a downtown; Lpmin may be set to a value that is as small as can be heard in the night in a quiet residential area; that is to say, the user can freely set Lpmax and Lpmin.

Next, the volume parameter interpolation processing unit 6 performs interpolation processing for a section between the volume maximum value Level_max and the volume minimum value Level_min calculated by the volume parameter calculation unit 5 in such a way that a volume parameter changes based on vehicle information such as a vehicle speed (ST24). The interpolation methods for the interpolation processing include those in FIGS. 8 and 9, explained in Embodiment 1.

Figure 20:
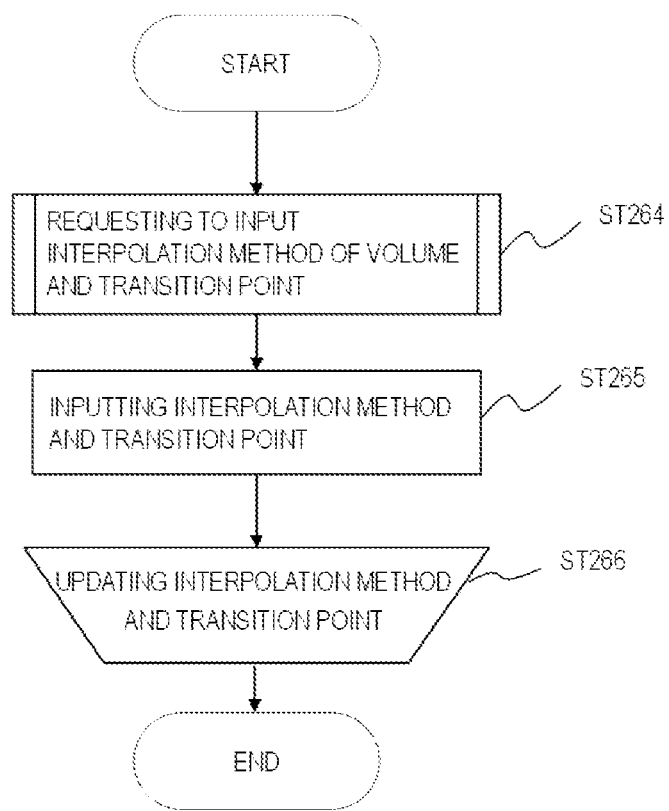
FIG. 20 is a flowchart representing an optional flow through an HMI in the flow of calculating volume parameters in the sound quality adjustment apparatus of the approaching vehicle audible system according to Embodiment 3 of the present invention.

The interpolation method may arbitrarily be inputted by a user through the input unit 9. FIG. 20 represents a flow in which a user can arbitrarily set the interpolation method through the input unit 9. The flow may be implemented, for example, in the step ST26 in FIG. 18. At first, the input unit 9 provides a display urging the user to input the interpolation method and the transition point (ST264). In response to the contents of the display, the user inputs the interpolation method and the transition point (ST265); then, the interpolation method and the transition point are updated to those inputted by the user (ST266). In such a way as described above, it is made possible to set the interpolation method that is desired by the user.

Next, the volume parameter updating unit 7 creates a parameter table with a format conforming to the configuration of the corresponding approaching vehicle audible system, for the volume parameter interpolated by the volume parameter interpolation processing unit 6, and the created parameter table replaces the parameter table that has been stored in the parameter storage unit 81 of the storage apparatus 8 and is stored in the parameter storage unit 81.

Figure 21:
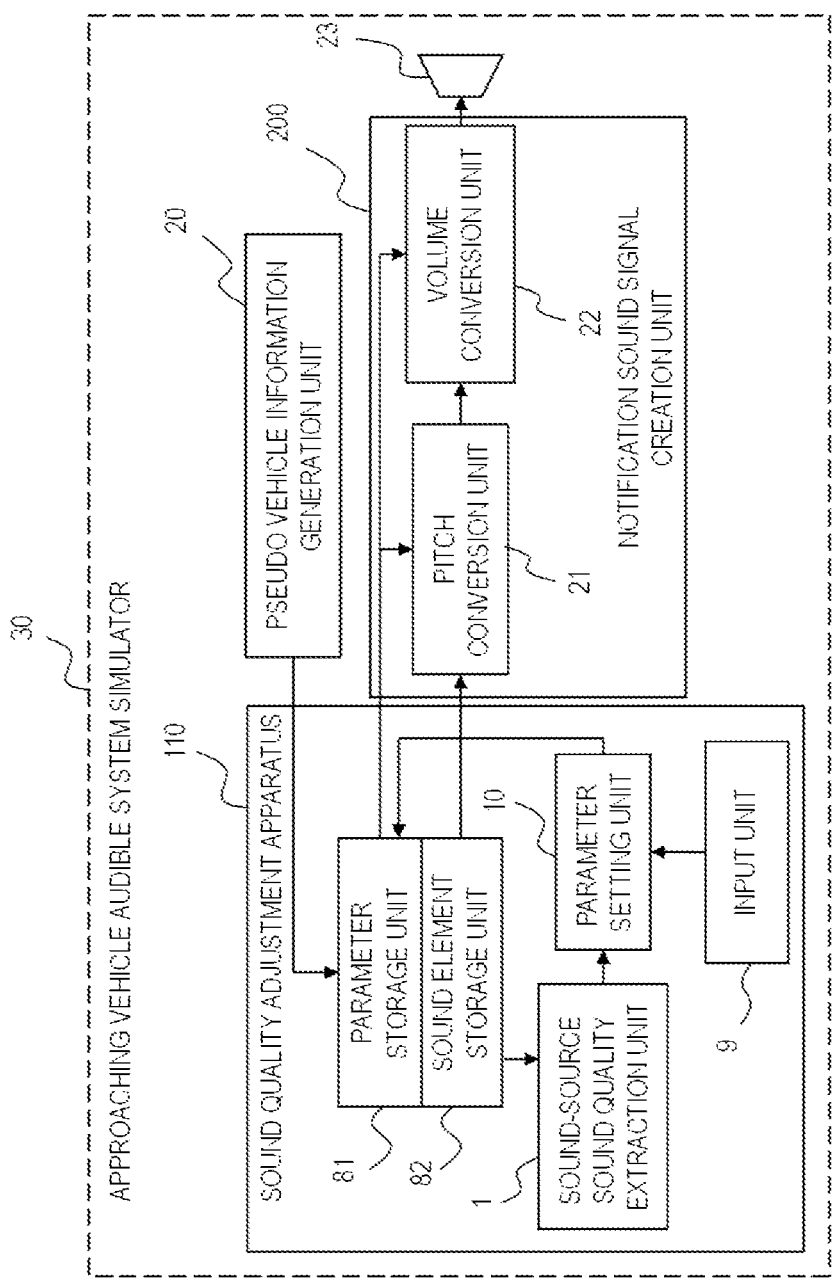
FIG. 21 is a block diagram representing the configuration of an approaching vehicle audible system simulator utilizing the sound quality adjustment apparatus of the approaching vehicle audible system according to Embodiment 3 of the present invention.

The foregoing sound quality adjustment apparatus of the approaching vehicle audible system is to be integrated in the approaching vehicle audible system; however, the sound quality adjustment apparatus may be integrated in an approaching vehicle audible system simulator so as to be utilized as a design tool for the approaching vehicle audible system. Hereinafter, an approaching vehicle audible system simulator utilizing the sound quality adjustment apparatus of the approaching vehicle audible system according to Embodiment 3 of the present invention will be explained. FIG. 21 is a block diagram representing the configuration of an approaching vehicle audible system simulator utilizing the sound quality adjustment apparatus of the approaching vehicle audible system according to Embodiment 3 of the present invention. The approaching vehicle audible system simulator 30 is configured for the purpose that in the sound quality adjustment apparatus 110 illustrated in FIG. 14, a sound element stored in the sound element storage unit is converted by the pitch conversion unit 21 and the volume conversion unit 22 by use of the pitch parameter and the volume parameter stored in the parameter storage unit 81 so that a notification sound is generated by the sounding device 23 such as a speaker and the sound quality of the notification sound is ascertained.

By use of the reference value A, fpmax, fpmin, Lpmax, Lpmin, the pitch interpolation method, the transition point therefore, the volume interpolation method, and the transition point therefore that are inputted by a user through the input unit 9, the parameter table with the pitch parameter and the volume parameter is stored in the parameter storage unit 81. The pitch conversion unit 21 receives a pitch parameter that is transmitted from the parameter storage unit 81 and corresponds to vehicle information outputted from the pseudo vehicle information generation unit 20, converts the sound signal of a sound element, and outputs the converted sound signal. Similarly, the volume conversion unit 22 receives the volume parameter that corresponds to vehicle information outputted from the pseudo vehicle information generation unit 20 and is transmitted from the parameter storage unit 81, and then changes the volume, i.e., the amplitude of sound data outputted from the pitch conversion unit 21. In such a way as described above, based on the notification sound signal that is sound element data outputted after being converted by the pitch conversion unit 21 and the volume conversion unit 22, the sounding device 23 generates a notification sound; then, the sound quality of the notification sound is ascertained.

If the ascertained sound quality of the notification sound dose not satisfy the user, the reference value A, fpmax, fpmin, Lpmax, Lpmin, the pitch interpolation method, the displace point therefor, the volume interpolation method, and the displace point therefor are set again, so that the parameters can be changed until the user is satisfied with the contents.

The foregoing method makes it possible to provide a sound quality adjustment apparatus in which even when the sound qualities of sound elements are different from one another, a user arbitrarily sets various kinds of parameters and ascertains the result of the setting through a sounding device, so that the sound quality can simply be adjusted. The foregoing embodiments are described about the sound quality adjustment apparatus of an approaching vehicle audible system and an approaching vehicle audible system simulator; however, the approaching vehicle audible system simulator can also be integrated, for example, as an adjustment tool, in a personal computer.

Embodiment 4

Figure 22:
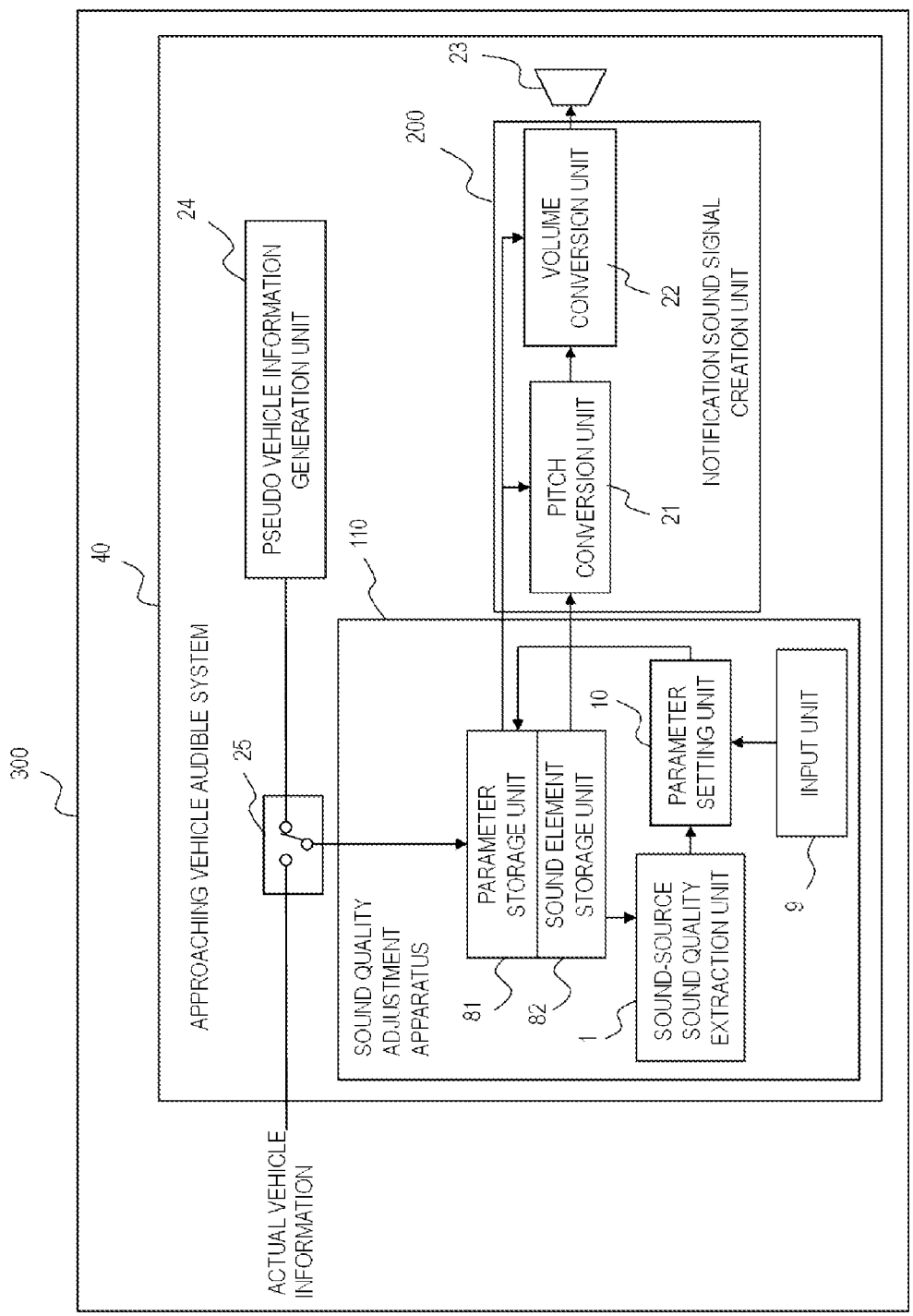
FIG. 22 is a block diagram representing the configuration of an approaching vehicle audible system according to Embodiment 4 of the present invention.
Figure 23:
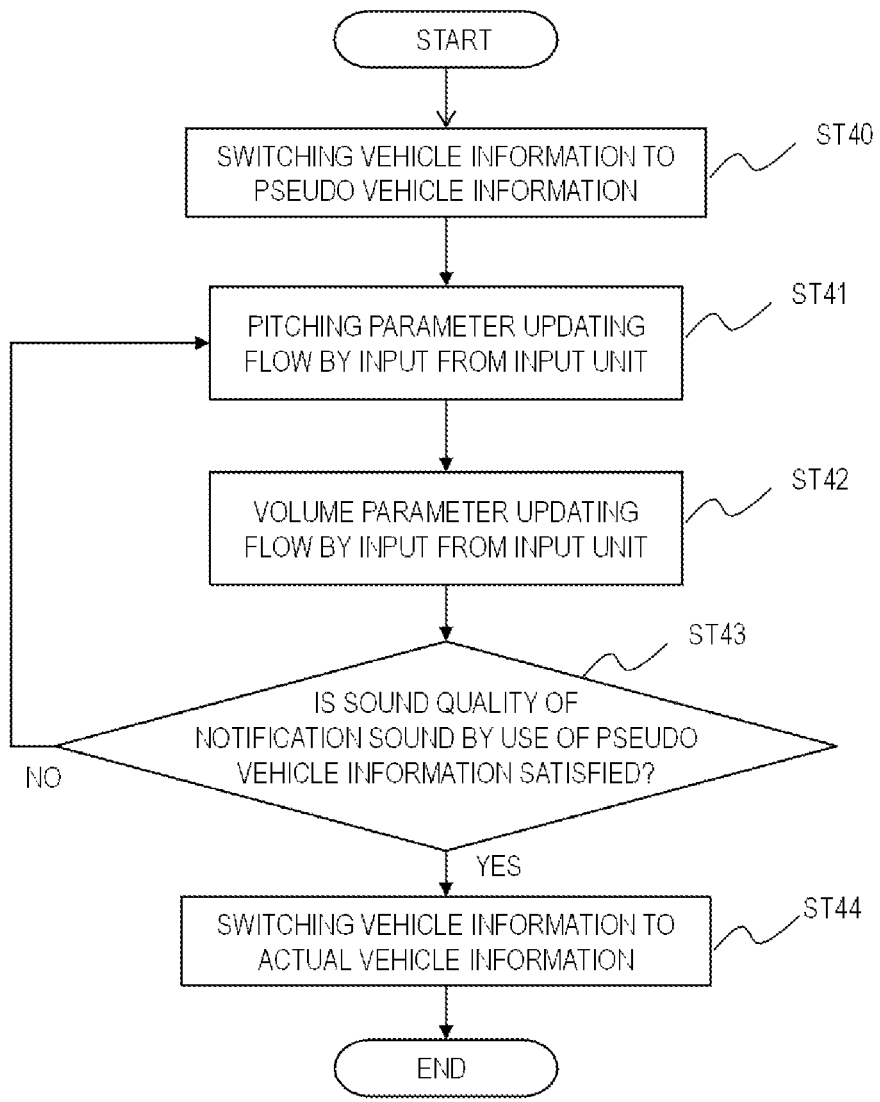
FIG. 23 is a flowchart representing the operational flow of the approaching vehicle audible system according to Embodiment 4 of the present invention.

FIG. 22 is a block diagram representing the configuration of an approaching vehicle audible system according to Embodiment 4 of the present invention; FIG. 23 is a flowchart representing the operational flow of the approaching vehicle audible system according to Embodiment 4 of the present invention. An approaching vehicle audible system 40 is configured with the sound quality adjustment apparatus 110, the pitch conversion unit 21, the volume conversion unit 22, the sounding device 23, a pseudo vehicle information generation unit 24, a vehicle information switching unit 25, and the like. The approaching vehicle audible system 40 is mounted in an electric vehicle 300, such as an electric automobile or a hybrid automobile, that generates at least part of driving force by means of a motor.

The sound quality adjustment apparatus 110 is provided with the input unit 9 similar to the one explained in Embodiment 3 and is configured in such a way that a user can set various kinds of coefficients. The pseudo vehicle information generation unit 24 stores pseudo vehicle information simulating a vehicle speed or the like at a time when the electric vehicle 300 practically travels, and generates the pseudo vehicle information, as may be necessary. With regard to vehicle information to be utilized by the sound quality adjustment apparatus 110, the vehicle information switching unit 25 performs switching between vehicle information generated by the pseudo vehicle information generation unit 24 and actual real-vehicle vehicle information. The respective configurations and operations of the units in the sound quality adjustment apparatus 110, i.e., the parameter storage unit 81, the sound element storage unit 82, the sound-source sound quality extraction unit 1, the parameter setting unit 10, and the input unit 9 are the same as those explained in Embodiment 3. The pitch conversion unit 21, the volume conversion unit 22, and the sounding device 23 have respective functions the same as the respective corresponding functions of the pitch conversion unit 21, the volume conversion unit 22, and the sounding device 23 in the approaching vehicle audible system simulator 30 explained in Embodiment 3.

The operation of the approaching vehicle audible system 40 according to Embodiment 4 will be explained with reference to FIGS. 22 and 23. At first, the vehicle information switching unit 25 sets the vehicle information to be utilized to vehicle information generated by the pseudo vehicle information generation unit 24 (ST40). Next, the sound quality adjustment apparatus 110 implements the flow represented in FIG. 15 explained in Embodiment 3, which is a pitch parameter updating flow based on the input from the input unit 9 (ST41). In other words, by use of the reference value A, fpmax, fpmin, the pitch interpolation method, and the transition point therefore that are inputted by a user through the input unit 9, the pitch parameter table obtained by the parameter setting unit 10 is stored in the parameter storage unit 81. Next, the sound quality adjustment apparatus 110 implements the flow represented in FIG. 18 explained in Embodiment 3, which is a volume parameter updating flow based on the input from the input unit 9 (ST42). In other words, by use of Lpmax, Lpmin, the volume interpolation method, and the transition point therefore that are inputted by the user through the input unit 9, the volume parameter table obtained by the parameter setting unit 10 is stored in the parameter storage unit 81.

Next, the pseudo vehicle information generation unit 24 generates pseudo vehicle information; by use of the pitch and volume parameters stored in the parameter storage unit 81 through the foregoing flow, sound element data is converted by the pitch conversion unit 21 and the volume conversion unit 22 with the pitch and volume parameters corresponding to the generated pseudo vehicle information; based on the outputted sound data, the sounding device 23 generates a notification sound; then, the user listens to the notification sound in a trial manner (ST43). In the case where the user is not satisfied with the sound quality of the generated sound (ST43: NO), the step ST41 is resumed, and then, the user inputs again the reference value A, fpmax, fpmin, Lpmax, Lpmin, the pitch interpolation method, the transition point therefor, the volume interpolation method, and the transition point therefor; this loop is repeated until the sound quality becomes satisfactory. In the case where satisfactory sound quality is obtained, the vehicle information switching unit 25 performs switching in such a way that the vehicle to be utilized becomes vehicle information of the electric vehicle 300 itself, for the purpose of making the approaching vehicle audible system 40 operate with the satisfactory sound quality; when the vehicle actually travels, a notification sound is generated by use of the pitch and volume parameters stored in the parameter storage unit 81 of the sound quality adjustment apparatus.

In the foregoing embodiment, the trial listening of a notification sound has been implemented while pseudo vehicle information is generated; however, it may be allowed that the trial listening is implemented by use of real-vehicle vehicle information while the electric vehicle 300 is made to actually travel. In this case, the pseudo vehicle information generation unit 24 and the vehicle information switching unit 25 can be omitted.

The foregoing method makes it possible to provide an approaching vehicle audible system provided with a sound quality adjustment apparatus in which even when the sound qualities of sound elements are different from one another, a user arbitrarily sets various kinds of parameters and ascertains the result of the setting through a sounding device, so that the sound quality can simply be adjusted.

Figure 24:
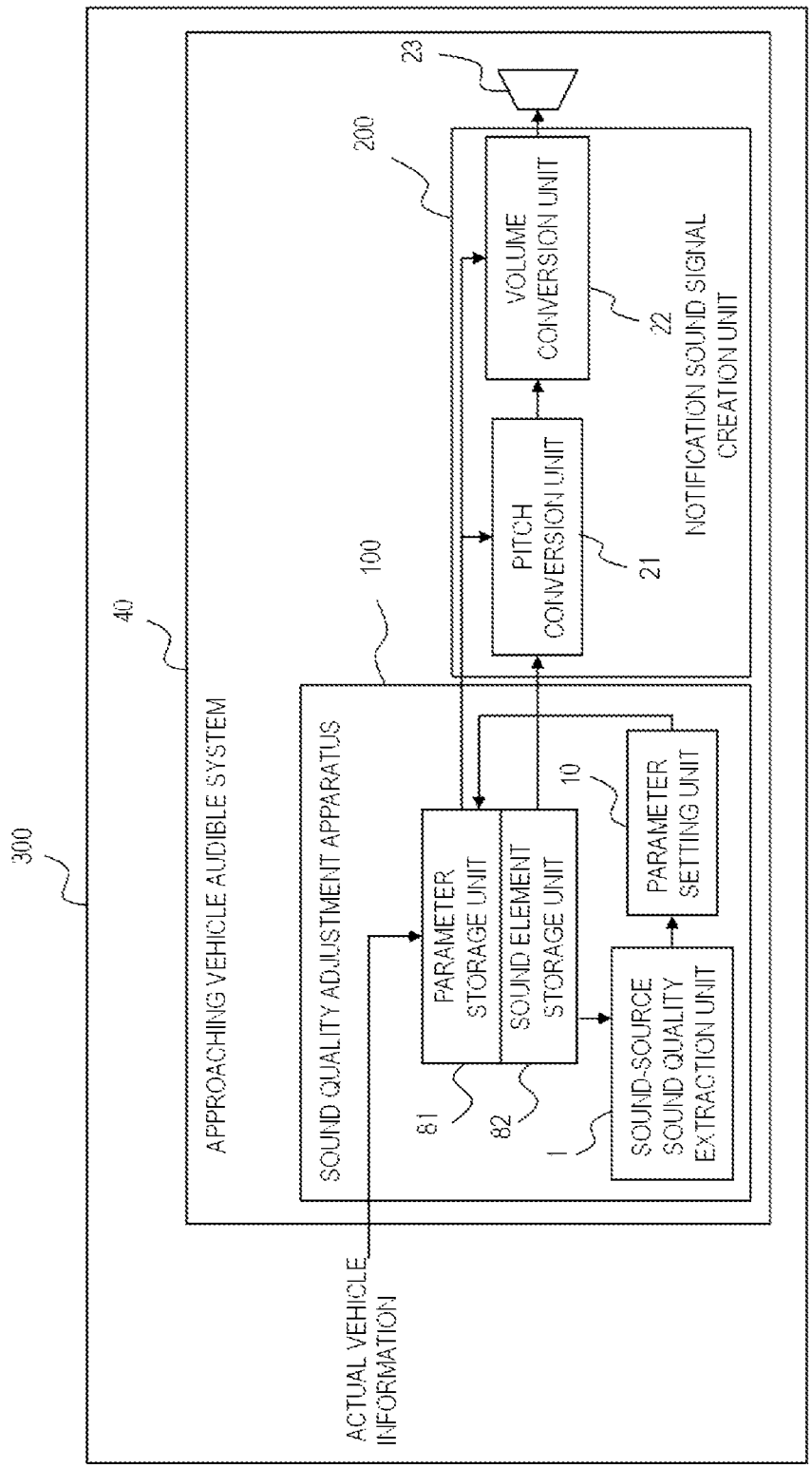
FIG. 24 is a block diagram representing another configuration of the approaching vehicle audible system according to Embodiment 4 of the present invention.

Moreover, in the foregoing embodiment, an approaching vehicle audible system equipped with the sound quality adjustment apparatus 110, of the approaching vehicle audible system according to Embodiment 3, provided with the input unit 9 has been explained; however, it may be allowed that as illustrated in FIG. 24, instead of the sound quality adjustment apparatus 110, a sound quality adjustment apparatus provided with no input unit 9, for example, the sound quality adjustment apparatus, of the approaching vehicle audible system illustrated in FIG. 1, that has been explained in Embodiment 1 is mounted. In this case, because the pseudo vehicle information generation unit 24 is not provided, either, a user cannot directly change the sound quality; however, it is made possible to provide an approaching vehicle audible system that generates a notification sound conforming to the sound quality of a sound element, for example, even when the sound element data is changed. As described above, it is only necessary that an approaching vehicle audible system according to the present invention is provided with the sound quality adjustment apparatus of the approaching vehicle audible system according to any one of Embodiments 1 through 3, the notification sound signal creation unit 200, and the sounding device 23.

In the scope of the present invention, the embodiments thereof can be combined with one another and can appropriately be modified or omitted.

DESCRIPTION OF REFERENCE NUMERALS

1: sound-source sound quality extraction unit
2: pitch parameter calculation unit
3: pitch parameter interpolation processing unit
4: pitch parameter updating unit
5: volume parameter calculation unit
6: volume parameter interpolation processing unit
7: volume parameter updating unit
8: storage apparatus
9: input unit
10: parameter setting unit
11: FFT unit
12: frequency peak extraction unit
13: volume peak extraction unit
20, 24: pseudo vehicle information generation unit
21: pitch conversion unit
22: volume conversion unit
23: sounding device
25: vehicle information switching unit
30: approaching vehicle audible system simulator
40: approaching vehicle audible system
81: parameter storage unit
82: sound element storage unit
100, 110: sound quality adjustment apparatus
200: notification sound signal creation unit
300: electric vehicle

The invention claimed is:

1. A sound quality adjustment apparatus of an approaching vehicle audible system for emitting a notification sound to the outside of an electric vehicle that generates at least part of driving force by use of a motor, the sound quality adjustment apparatus of an approaching vehicle audible system comprising:
   a sound element storage unit that previously stores sound element data forming an element of the notification sound;
   a sound-source sound quality extraction unit that analyses the sound element data so as to extract a characteristic value related to the sound quality of a sound element;
   a parameter setting unit that obtains a parameter for converting the sound element data in accordance with vehicle information on the electric vehicle, by use of the characteristic value, related to the sound quality of a sound element, that is extracted by the sound-source sound quality extraction unit; and
   a parameter storage unit that stores the parameter obtained by the parameter setting unit.

2. The sound quality adjustment apparatus of an approaching vehicle audible system according to claim 1, wherein the characteristic value, related to the sound quality of the sound element, that is extracted by the sound-source sound quality extraction unit is a peak frequency fp at which a frequency distribution obtained by applying FFT processing to the sound element data reaches a peak, and wherein the parameter to be obtained by the parameter setting unit is a pitch parameter for converting the pitch of the sound element data.

3. The sound quality adjustment apparatus of an approaching vehicle audible system according to claim 2, wherein by use of the peak frequency fp and a frequency maximum value fpmax and a frequency minimum value fpmin that are preliminarily set for the notification sound, a maximum value Pitch_max and a minimum value Pitch_min of the pitch parameter are obtained in accordance with the following equations:

Pitch_max=$f$pmax/$f$p

Pitch_min=$f$pmin/$f$p.

4. The sound quality adjustment apparatus of an approaching vehicle audible system according to claim 2, wherein when the sound-source sound quality extraction unit extracts a plurality of peaks, the difference of each of which from the level at the peak frequency fp is the same as or smaller than a reference value A, the lowest frequency among the frequencies of the plurality of peaks including the peak frequency fp is referred to as fpL and the highest frequency is referred to as fpH, and wherein by use of fpH, fpL, and the frequency maximum value fpmax and the frequency minimum value fpmin that are preliminarily set for the notification sound, the maximum value Pitch_max and the minimum value Pitch_min of the pitch parameter are obtained in accordance with the following equations:

Pitch_max=$f$pmax/$f$pH

Pitch_min=$f$pmin/$f$pL.

5. The sound quality adjustment apparatus of an approaching vehicle audible system according to claim 3, wherein the parameter setting unit applies interpolation processing to the section between Pitch_min and Pitch_max, obtains a pitch parameter corresponding to the value of the vehicle information, and stores in the parameter storage unit a table with a pair of the value of the vehicle information and the value of the pitch parameter.

6. The sound quality adjustment apparatus of an approaching vehicle audible system according to claim 3, further including an input unit for a user to input data, wherein through the input unit, fpmax and fpmin are inputted.

7. The sound quality adjustment apparatus of an approaching vehicle audible system according to claim 4, further including an input unit for a user to input data, wherein through the input unit, the reference value A is inputted.

8. The sound quality adjustment apparatus of an approaching vehicle audible system according to claim 5, further including an input unit for a user to input data, wherein through the input unit, an interpolation method for the interpolation processing is inputted.

9. The sound quality adjustment apparatus of an approaching vehicle audible system according to claim 1, wherein the characteristic value, related to the sound quality of the sound element, that is extracted by the sound-source sound quality extraction unit is a peak value Lp of the volume level of the sound element data, and wherein the parameter to be obtained by the parameter setting unit is a volume parameter for changing the volume of the sound element data.

10. The sound quality adjustment apparatus of an approaching vehicle audible system according to claim 9, wherein by use of Lp and a volume maximum value Lpmax and a volume minimum value Lpmin that are preliminarily set for the notification sound, a maximum value Level_max and a minimum value Level_min of the volume parameter are obtained in accordance with the following equations:

Level_max=$L$pmax/$L$p

Level_min=$L$pmin/$L$p.

11. The sound quality adjustment apparatus of an approaching vehicle audible system according to claim 10, wherein the parameter setting unit applies interpolation processing to the section between Level_min and Level_max, obtains the volume parameter corresponding to a value of the vehicle information, and stores in the parameter storage unit a table with a pair of the value of the vehicle information and the value of the volume parameter.

12. The sound quality adjustment apparatus of an approaching vehicle audible system according to claim 10, further including an input unit for a user to input data, wherein through the input unit, Lpmax and Lpmin are inputted.

13. The sound quality adjustment apparatus of an approaching vehicle audible system according to claim 11, further including an input unit for a user to input data, wherein through the input unit, an interpolation method for the interpolation processing is inputted.

14. An approaching vehicle audible system simulator comprising:
the sound quality adjustment apparatus of an approaching vehicle audible system according to claim 1;
a pseudo vehicle information generation unit that outputs pseudo vehicle information simulating the vehicle information;
a notification sound signal creation unit that converts the sound element data stored in the sound element storage unit by use of a parameter stored in the parameter storage unit and the pseudo vehicle information outputted from the pseudo vehicle information generation unit so as to generate a notification sound signal; and
a sounding device that generates a notification sound based on a notification sound signal created by the notification sound signal creation unit.

15. An approaching vehicle audible system comprising:
the sound quality adjustment apparatus of an approaching vehicle audible system according to claim 1;
a notification sound signal creation unit that converts the sound element data stored in the sound element storage unit by use of a parameter stored in the parameter storage unit and the vehicle information so as to generate a notification sound signal; and
a sounding device that generates a notification sound based on a notification sound signal created by the notification sound signal creation unit.

16. The approaching vehicle audible system according to claim 15, wherein the vehicle information can be switched between pseudo vehicle information stored as data simulating actual vehicle information and vehicle information obtained from the electric vehicle.

17. The sound quality adjustment apparatus of an approaching vehicle audible system according to claim 4, wherein the parameter setting unit applies interpolation processing to the section between Pitch_min and Pitch_max, obtains a pitch parameter corresponding to the value of the vehicle information, and stores in the parameter storage unit a table with a pair of the value of the vehicle information and the value of the pitch parameter.

18. The sound quality adjustment apparatus of an approaching vehicle audible system according to claim 17, further including an input unit for a user to input data, wherein through the input unit, an interpolation method for the interpolation processing is inputted.

19. The sound quality adjustment apparatus of an approaching vehicle audible system according to claim 4, further including an input unit for a user to input data, wherein through the input unit, fpmax and fpmin are inputted.

\* \* \* \* \*